(12) United States Patent
Gritti

(10) Patent No.: US 12,078,621 B2
(45) Date of Patent: Sep. 3, 2024

(54) AUTOMATED SEMI-PREPARATIVE GRADIENT RECYCLING LIQUID CHROMATOGRAPHY

(71) Applicant: Waters Technologies Corporation, Milford, MA (US)

(72) Inventor: Fabrice Gritti, Franklin, MA (US)

(73) Assignee: Waters Technologies Corporation, Milford, MA (US)

(*) Notice: Subject to any disclaimer, the term of this patent is extended or adjusted under 35 U.S.C. 154(b) by 33 days.

(21) Appl. No.: 17/699,775

(22) Filed: Mar. 21, 2022

(65) Prior Publication Data

US 2022/0308020 A1    Sep. 29, 2022

Related U.S. Application Data

(60) Provisional application No. 63/165,914, filed on Mar. 25, 2021.

(51) Int. Cl.
| | |
|---|---|
| G01N 30/46 | (2006.01) |
| G01N 30/02 | (2006.01) |
| G01N 30/32 | (2006.01) |
| G01N 30/82 | (2006.01) |
| G01N 30/30 | (2006.01) |

(52) U.S. Cl.
CPC .......... G01N 30/461 (2013.01); G01N 30/82 (2013.01); *G01N 2030/027* (2013.01); *G01N 2030/3007* (2013.01); *G01N 2030/326* (2013.01); *G01N 2030/328* (2013.01)

(58) Field of Classification Search
CPC ............... G01N 30/461; G01N 30/82; G01N 2030/027; G01N 2030/3007; G01N 2030/326; G01N 2030/328
See application file for complete search history.

(56) References Cited

U.S. PATENT DOCUMENTS

2019/0366234 A1    12/2019    Gritti et al.

FOREIGN PATENT DOCUMENTS

| EP | 1544612 A1 | 6/2005 |
|---|---|---|
| WO | 2006116886 A1 | 11/2006 |
| WO | 2013083482 A1 | 6/2013 |

OTHER PUBLICATIONS

LCGC North America, "Understanding gradient HPLC", LCGC North America, vol. 31, Issue 7, p. 578. (Year: 2013).*

(Continued)

*Primary Examiner* — Benjamin L Lebron
(74) *Attorney, Agent, or Firm* — WOMBLE BOND DICKINSON (US) LLP; Deborah M. Vernon; Mark R. Deluca

(57) ABSTRACT

The disclosure relates to a gradient twin column recycling chromatography method that is used to separate a mixture containing closely eluting compounds. In one embodiment, a sample includes a primary organic compound and one or more impurities that closely elute with the primary organic compound. A gradient mobile phase is initially used to remove unwanted early eluting and late eluting impurities from the sample. After the gradient removal of some of the impurities is complete, the remaining mixture of the primary organic compound and the closely eluting impurities are separated using recycle chromatography methodology with an isocratic mobile phase.

10 Claims, 15 Drawing Sheets

(56) References Cited

OTHER PUBLICATIONS

Gritti, F., et al., "Semi-preparative high-resolution recycling liquid chromatography", Journal of Chromatography A, 1566, 64-78. (Year: 2018).*

Guiochon et al. "Implementations of two-dimensional liquid chromatography." J. Chromatogr. A. 1189.1-2(2008): 109-168.

International Search Report and Written Opinion issued in International Application No. PCT/IB2022/052569 dated Jun. 3, 2022.

* cited by examiner

AUTOMATED SEMI-PREPARATIVE GRADIENT RECYCLING LIQUID CHROMATOGRAPHY

RELATED APPLICATIONS

This application claims the benefit of and priority to U.S. Provisional Patent Application No. 63/165,914 filed on Mar. 25, 2021 titled "AUTOMATED SEMI-PREPARATIVE GRADIENT RECYCLING LIQUID CHROMATOGRAPHY" the contents of which are incorporated herein by reference in their entirety.

FIELD OF THE TECHNOLOGY

The present disclosure relates to high resolution and semi-preparative recycling chromatography methods and systems for isolation and preparation of organic compounds. More specifically, the present disclosure relates to methods and devices based on an assembly of an integrated chromatographic instrument for the separation and/or isolation of impurities from a concentrated solution of an organic compound using a combination of a gradient mobile phase and an isocratic mobile phase.

BACKGROUND

Separation and production problems arise when a targeted organic compound and one or more impurities nearly co-elute and the relative abundance of the impurities is very small (for example, less than about $1/100$) compared to the organic compound. For the lack of sufficient resolution, standard preparative processes such as batch chromatography, simulated mobbing bed (SMB), stead state recycling (SSR), or multi-column countercurrent solvent gradient cannot fully solve this problem.

SUMMARY

The present technology solves the problems of the prior art by combining high resolution performance with semi-preparative capabilities into a single purification process. In essence, these two characteristics are antagonist: preparative chromatography faces large volumes and high concentrations, while high resolution chromatography handles small and diluted samples. Complex separation problems can be solved by alternate pumping or twin column recycling liquid chromatography (TCRLC). TCRLC is described in U.S. Patent Application Publication No. 2019/0366234 to Gritti et al., which is incorporated herein by reference. The general principle of TCRLC is to virtually increase the column length while still operating at optimum velocity and standard pressure. Even though the production rate of such discontinuous TCRLC is clearly lower than that of continuous SMB or semi-continuous SSR processes, it has several advantages including (1) the experimental set-up can be easily assembled, (2) it can solve extremely challenging separation problems (selectivity factor $\alpha<1.2$ with analyte to analyte abundance ratio $<1/100$, (3) it can cope with strong sample diluent and viscous fingering effects by applying a large enough number of cycles, and (4) its long-time automation can be maintained by maintaining steady the eluent and column temperature. For these reasons, a TCRLC process coupled with a fraction collector is a solution to critical separation problems such as those faced by the pharmaceutical industry.

The TCRLC process may be improved by using an initial gradient mobile phase to separate early eluting compounds and late eluting compounds from the analyte band containing the organic compound and impurities of interest. A sample is introduced into a mobile phase flow stream of a chromatography system to create a combined flow stream. The sample includes an organic compound and one or more impurities. The chromatography system includes: (1) a first chromatographic column and a second chromatographic column positioned in series; and (2) a fraction collector in fluid communication with the first chromatographic column and the second chromatographic column. The sample is passed through the first chromatographic column using a gradient mobile phase stream. During passage of the sample through the first chromatographic column one or more of the impurities (the early eluting compounds) are transferred to the fraction collector and the organic compound and impurities of interest are transferred to the second chromatographic column as an analyte band. The second chromatographic column is fluidically isolated from the first chromatographic column, and the gradient mobile phase is continued in the first chromatographic column. The gradient mobile phase is used to push the one or more of the impurities remaining on the first chromatographic column (the late eluting compounds) off of the column to the fraction collector. The analyte band is passed through the second chromatographic column using an isocratic mobile phase stream. The analyte band is recycled from the second chromatographic column to the first chromatographic column and from the first chromatographic column to the second chromatographic column using the isocratic mobile phase stream until a desired resolution (e.g., a baseline resolution) of the organic compound and one or more of the close eluting impurities in the analyte band is achieved. The separated organic compound and impurities are transferred to the fraction collector for collection.

The use of a gradient mobile phase allows separation of early and late eluting impurities from the analyte band containing the compounds of interest. In one embodiment, low retention time impurities (i.e., early eluting compounds), with respect to the analyte band, are transferred to the fraction collector prior to transferring the analyte band to the second chromatographic column during passage of the sample through the first chromatographic column using the gradient mobile phase stream. After some (or all) of the early eluting impurities are removed, the analyte band is transferred to the second chromatographic column. Once the analyte band is transferred to the second chromatographic column, the flow of the gradient mobile phase stream is stopped in the second chromatographic column, and the flow of the mobile gradient phase stream is continued through the first chromatographic column. The gradient mobile phase stream passing through the first chromatographic column is used to remove one or more high retention time (i.e., late eluting compounds), with respect to the analyte band, from the first chromatographic column. Once it is determined that a sufficient amount of late eluting compounds (or all) have been removed from the first chromatographic column, an isocratic mobile phase stream is flowed through the first chromatographic column until the column is equilibrated with the isocratic mobile phase stream. The recycle process is then initiated using the isocratic mobile phase stream.

The chromatography system can be a liquid chromatography system, a gas chromatography system, a supercritical fluid chromatography system, or a capillary electrophoresis chromatography system. In some embodiments, the chromatography system is a semi-preparative chromatography system. The chromatography system can be a semi-preparative, high performance liquid chromatography system.

In some embodiments, the first chromatographic column and the second chromatographic column are identical.

In an embodiment, the chromatography system includes one or more valves coupling a pump to the first chromatographic column and the second chromatographic column and coupling the first chromatographic column and the second chromatographic column to the fraction collector. The method further comprises activating the one or more valves at predetermined times, wherein the predetermined times are selected to automatically separate the impurities from the organic compound of interest. In one embodiment, a first valve couples a pump to an inlet port of the first chromatographic column and an inlet port of the second chromatographic column. A second valve is coupled to the first valve and an outlet port of the first chromatographic column. This configuration allows the analyte band containing the organic compound and impurities of interest to be maintained in a stationary position on the second chromatographic column, while later eluting impurities are removed from the first chromatographic column using a gradient mobile phase stream. In such a configuration, the first valve may be a 2-position, 6-port valve and the second valve may be a 2-position, 4-port valve. A controller may be coupled to the first valve and the second valve. During use, the controller automatically activates the first valve and the second valve according to a predetermined schedule.

The method further comprises analyzing the gradient mobile phase stream or the isocratic mobile phase stream for the presence of the organic compound of interest and/or the presence of one or more impurities as the gradient mobile phase stream or the isocratic mobile phase stream exits the first chromatographic column. Analysis of the output stream from the first chromatographic column may be performed using a detector coupled to the outlet of the first chromatographic column. The detector may be an ultraviolet light detector and/or a visible light detector.

The gradient mobile phase stream exiting the first chromatographic column is directed to the fraction collector or the second chromatographic column based on the analysis of the gradient mobile phase stream as the stream exits the first chromatographic column. Additionally, the isocratic mobile phase stream exiting the first chromatographic column is directed to the fraction collector or the second chromatographic column based on the analysis of the isocratic mobile phase stream as the stream exits the first chromatographic column.

The method can also include pre-determining a number of valve switches to achieve the desired resolution of separation of the one or more impurities from the organic compound of interest. In some embodiments, the method also includes repeating the injecting, recycling and collecting steps until about 1 mg of one or more impurities is collected in the fraction collector.

In some embodiments, the selectivity factor of the organic compound of interest and the at least one impurity is <1.2. In other embodiments, the selectivity factor of the organic compound of interest and the at least one impurity is <1.1.

In some embodiments, the chromatographic system includes a heater in thermal communication with the first chromatographic column and/or the second chromatographic column. The heater can maintain a column temperature between about 20° C. to about 100° C.

In some embodiments, the isocratic stream and/or gradient stream has a flow rate between about 0.5 mL/min and about 2 mL/min and the first chromatographic column and the second chromatographic column each have an inner diameter of about 4.6 mm. In some embodiments, the isocratic stream and/or the gradient stream has a flow rate between about 2 mL/min and about 10 mL/min and the first chromatographic column and the second chromatographic column each have an inner diameter of about 1 cm.

In some embodiments, the chromatography system also includes a detector positioned between the first chromatographic column and the second chromatographic column. The chromatography system can also include a detector positioned before the fraction collector.

In some embodiments, the collected organic compound of interest and/or the collected impurities are about 90% pure. The collected organic compound of interest and/or the collected impurities can be about 95% pure. In some embodiments, the collected organic compound of interest and/or the collected impurities are about 99% pure.

In another aspect, the technology relates to a recycling chromatography system for separating an organic compound of interest and at least one impurity. The recycling chromatography system includes a pump for creating an isocratic or gradient mobile phase stream and an injector for injecting a sample into a mobile phase flow stream creating a combined flow stream. The recycling chromatography system also includes a first chromatographic column and a second chromatographic column positioned in series and downstream of the injector. A first valve couples the pump and injector to an inlet port of the first chromatographic column and an inlet port of the second chromatographic column. A second valve is coupled to the first valve and an outlet port of the first chromatographic column. This two-valve configuration is used to maintain the organic compound and impurities of interest in a substantially stationary position on the second chromatographic column, while a flow of a mobile phase stream is maintained through the first chromatographic column.

The recycling chromatography system also includes a fraction collector in fluid communication with the first chromatographic column and the second chromatographic column. The fraction collection system includes a collection valve. The collection valve is coupled to the second valve. The collection valve is further coupled to a collection container and a waste container. The recycling chromatography system can include one or more embodiments described herein.

In some embodiments, the first chromatographic column and the second chromatographic column are identical. For example, the first chromatographic column and the second chromatographic column can have the same length and inner diameter and have the same stationary phase material.

BRIEF DESCRIPTION OF THE DRAWINGS

The technology will be more fully understood from the following detailed description taken in conjunction with the accompanying drawings, in which.

DETAILED DESCRIPTION

The technology relates to chromatographic methods and systems that combine high resolution performance with semi-preparative capabilities into a single purification process. In essence, these two characteristics are antagonist: preparative chromatography faces large volumes and high concentrations, while high resolution chromatography handles small and diluted samples. Complex separation problems can be solved by alternate pumping or twin column recycling liquid chromatography (TCRLC). The general principle of TCRLC is to virtually increase the column length while still operating at optimum velocity and standard pressure. A TCRLC process coupled with a fraction collector is a solution to critical separation problems such as those faced by the pharmaceutical industry.

Figure 1:
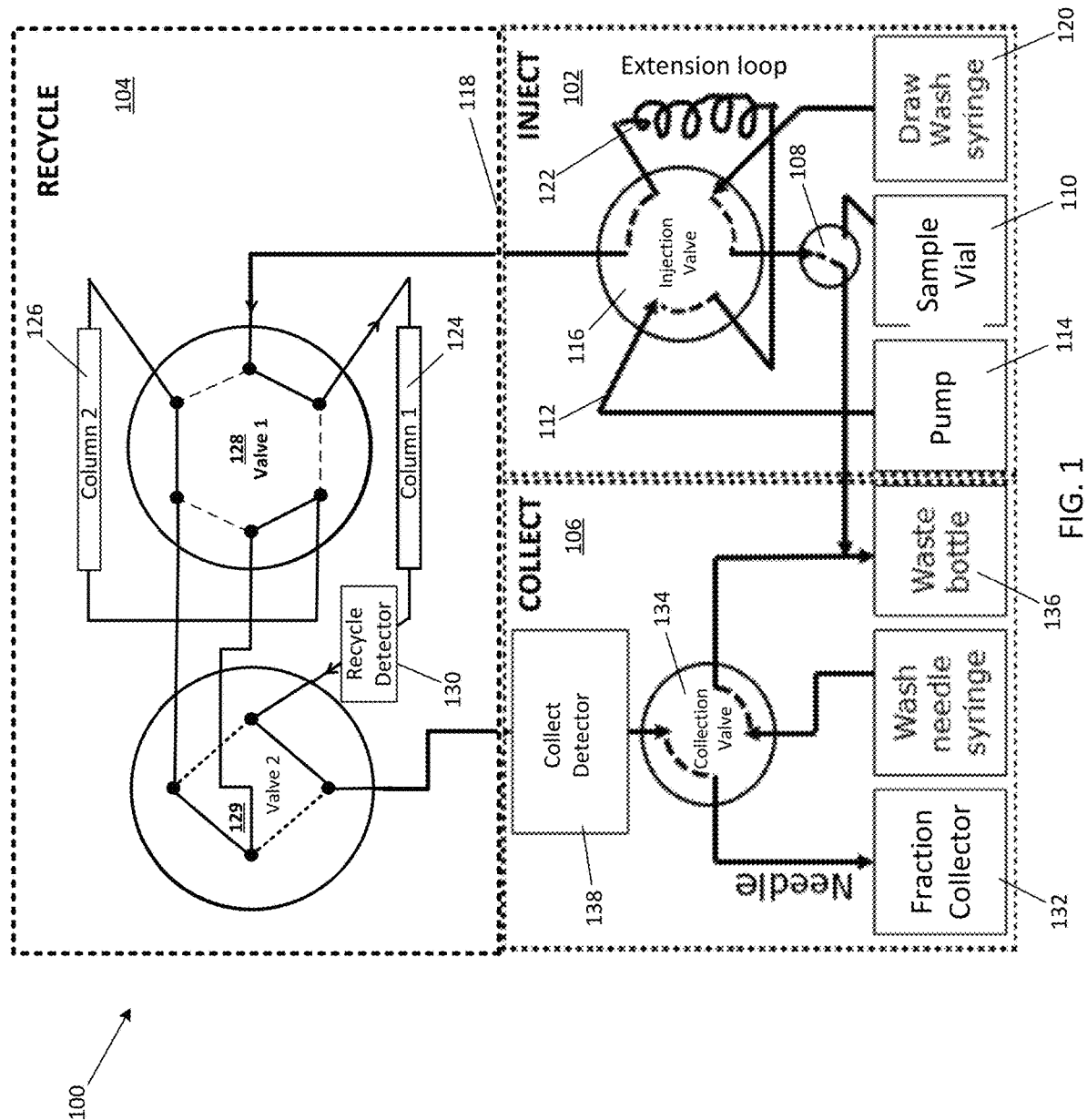
FIG. 1 is a schematic diagram of a semi-preparative, high resolution twin column recycling liquid chromatography system, according to an illustrative embodiment of the technology.

FIG. 1 is a schematic diagram of a semi-preparative, high resolution twin column recycling chromatography system 100. The system 100 can be a liquid chromatography system, a gas chromatography system, a supercritical fluid chromatography system, or a capillary electrophoresis chromatography system. The system 100 can be an analytical chromatography system or a semi-preparative chromatography system. In some embodiments, the system 100 is a semi-preparative, high performance liquid chromatography system.

The system 100 includes three subunits: an injection subunit 102; a recycling subunit 104; and a collection subunit 106. The injection subunit 102 includes an injector 108 for injecting a sample from a sample vial 110 or a sample manager (not shown) into a mobile phase flow stream 112. In embodiments where a sample manager is used, the sample manager can include, for example, 10 mL sample vials.

The mobile phase is pumped into the system 100 by pump 114 and flows into an injection valve 116. In some embodiments, pump 114 can be a binary solvent pump that can pump up to about 5 mL/min of mobile phase into the chromatography system at a maximum pressure of about 600 bar.

Injection valve 116, can be, for example, a rotary valve and can have six ports. The injection valve 116 can be a spool valve, a linear valve, or a rotary valve. The valve 116 can be, for example, a rotary shear valve. The valve 116 can be a low-dispersion valve. The injection valve 116 can allow the sample to mix with the mobile phase flow stream 112 forming a combined flow stream 118, prior to entering the chromatographic columns. The injection valve 116 can be actuated to a first position to draw up mobile phase and to a second position to inject the sample and to draw up wash solution 120 between chromatographic runs. In some embodiments, the injection subunit 102 includes an extension loop 122. The extension loop 122 can be used to increase the sampled volume.

The recycling subunit 104 includes a first chromatographic column 124 and a second chromatographic column 126. The first and second chromatographic columns 124, 126 are located downstream of the injector 108 and after the sample and mobile phase combine to form the combined flow stream 118. The chromatographic columns 124, 126 can be identical or substantially identical. For example, the first and second chromatographic columns 124, 126 can have the same length, inner diameter and packing material. The specific length, inner diameter, packing material, and other parameters of the columns 124, 126 will be known to those of skill in the art based on the specific separation to be run. For example, when the combined flow stream 118 has a flow rate between about 0.5 mL/min. and about 2 mL/min, then the first and second chromatographic columns 124, 126 can each have an inner diameter of about 4.6 mm. In another example, when the combined flow stream 118 has a flow rate between about 2 mL/min. and about 10 mL/min, then the first and second chromatographic columns 124, 126 can each have an inner diameter of about 1 cm. The columns can be packed with 3-5 µm particles.

Recycling unit includes a first valve 128 and a second valve 129 in fluid communication with the first and second columns 124, 126. First valve 128 and second valve 129 can be rotary valves, for example, rotary shear valves. Valves 128 and 129 can be, independently, a spool valve, a linear valve, or a rotary valve. Each valve 128 and 129 can be independently actuated between a first position and a second position to direct a mobile phase stream from the first chromatographic column 124 to the second chromatographic column 126; and from the second chromatographic column 126 to the first chromatographic column 124 until a baseline resolution of the organic compound and impurities is achieved. This mimics an infinitely long column that can still be operated at optimum velocity and low pressures. The entire chromatographic band of the targeted compounds can be recycled as many times as necessary between the twin columns until it the compounds are fully separated from each other and from other non-targeted impurities.

In some embodiments, an optional recycle detector 130 can be positioned after the first chromatographic column 124. The detector 130 can be used, for example, to determine whether the sample has been separated or determine if impurities, such as early and late eluting compounds, have passed through the first column. The detector 130 can also be used to define the timing of the valve movement. Where the number of valve switches has been predetermined based on experimental data or theoretical calculations, detector 130 can be eliminated. Detector 130 preferably does not destroy or substantially alter the compounds during the detection process or while the compounds are passing through the detector. The detector 130 may be an ultraviolet light detector and/or a visible light detector.

The chromatography system can include a heater (not shown) in communication with the first and second chromatographic columns 124, 126. The heater can be, for example, a two column oven with active eluent preheaters. The heater can maintain the column temperature between about 20° C. to about 100° C. The heater can maintain the column temperature at 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 46° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C., 91° C., 92° C., 93° C., 94° C., 95° C., 96° C., 97° C., 98° C., 99° C., or 100° C. These values can be used to form a range.

The chromatography system can also include a column manager (not shown) that is in communication with the first and second chromatographic columns 124, 126, the heater, and the valves 128 and 129. The column manager can include a computer that is loaded with software to allow the column manager to manage, for example, the valve switch times and the column temperature. The column manager can control and maintain the temperature of the columns and the mobile phase entering the column with a precision of about 0.1° C. As a result, the retention times of both the impurity and the API are very reproducible with a relative standard deviation of about 0.1%, even after multiple passes through the two columns and over an analysis time as large as about 12 hours.

The collection subunit 106 includes a fraction collector or collection vial 132 that is in fluid communication with the first and second chromatographic columns 124, 126. The fraction collector 132 can be used to collect different fractions eluting from the columns 124, 126. A collection valve 134 is positioned before the fraction collector 132. The collection valve 134 can be, for example, a rotary valve. The collection valve 134 can be a spool valve, a linear valve, or a rotary valve. The collection valve 134 can be, for example, a rotary shear valve. The collection valve 134 can be a four port valve. When the valve 134 is in a first position, the flow from the columns 124, 126 flow to a waste bottle 136. When the valve 134 is in a second position (as depicted in FIG. 1), the flow from the columns 124, 126 flow to the fraction collector 132.

The collection subunit 106 can also include a collection detector 138 positioned prior to the fraction collector 132. The collection detector 138 can be positioned before the valve 134. The detector 138 can be, for example, a UV-Vis diode array detector or a mass spectrometer. Any other type of detector can be used as well. If the chosen detector cannot withstand the system pressure, then a split flow approach can be used to allow the chosen detector to operate within its typical pressure limitations. The information from the detector 138 can be used to determine what is being collected in the fraction collector 132. In addition, the detector 138 can control the purity of the collected fraction of the unknown targeted impurity.

FIGS. 2-12 depict a sequence of steps for performing a gradient recycling chromatography method. The method includes using a combination of a gradient mobile phase and an isocratic mobile phase to separate the components in a sample. In an embodiment, the sample includes a primary organic compound and one or more impurities. For example, the sample can include one, two, three, four, five, six, or more impurities. The primary organic compound makes up at least 50% of the sample (not including any solvents used to dissolve the sample), with the impurities making up the remainder of the sample. The impurities can be trace impurities. A trace impurity is an unintended small amount of a substance other than the primary organic compound that is often difficult to detect and/or measure. Trace impurities can have, for example, a concentration of less than about 0.01 g/L in a concentrated solution of the primary organic compound (about 10 g/L). The selectivity factor of the primary organic compound and one or more of the impurities may be less than about 1.2.

Figure 2:
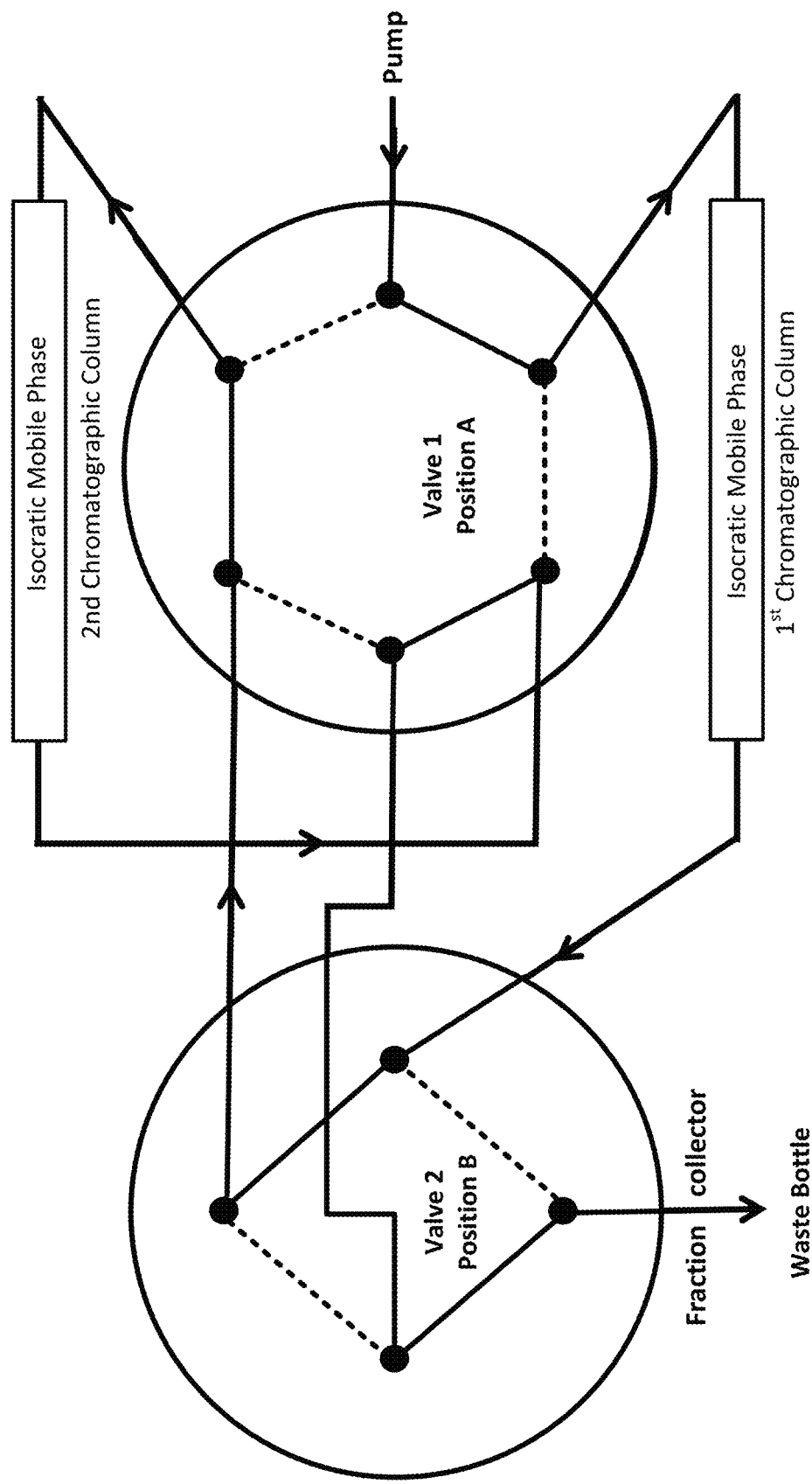
FIG. 2 is a schematic diagram of the positions Valve 1 and Valve 2 during equilibration of the columns with an isocratic mobile phase.

Prior to separation of the components of the sample, the chromatography system is prepared for use. The chromatography system can be, for example, the chromatography system of FIG. 1 including any embodiment described herein. Initially, as depicted in FIG. 2, the isocratic mobile phase is passed through the first chromatographic column and the second chromatographic column. An isocratic mobile phase stream, as used herein, is a stream composed of a single solvent, or a mixture of two or more solvents, where the concentration of the components of the isocratic mobile phase stream is constant. An isocratic mobile phase stream may be composed of a single solvent (e.g., 100% acetonitrile) or a mixture of two or more solvents (e.g., 80% acetonitrile/20% water). When two or more solvents are used, the concentration of each of the solvents does not change during use of the mobile phase for elution of the sample. The isocratic mobile phase is passed through the first chromatographic column and the second chromatographic column until the columns are equilibrated with the isocratic mobile phase. As used herein the term "equilibrated" means that the chemical composition of the adsorbed phase on the column surface and that of the mobile phase are both time-invariant everywhere in the column. In practice, the column is washed with about at least 5-10 column hold-up volumes of the isocratic mobile phase being used. This wash procedure ensures that the concentration of the mobile phase is substantially homogenous throughout the chromatographic column.

FIG. 2 shows a schematic diagram of first valve 128 and second valve 129 of chromatography system 100 set up to allow flow of the isocratic mobile phase through both the first chromatographic column and the second chromatographic column. The composition of the isocratic mobile phase stream is selected for the separation of the primary organic compound from closely eluting impurities. In the depicted embodiment, the first valve is a two position, six port valve. The first valve is depicted in position A. The second valve is a two position, four port valve. The second valve is depicted in position B. As shown, the isocratic mobile phase stream is sent from the pump, through the first chromatographic column, then through the second chromatographic column, and finally into the fraction collector where the solvent is collected in a waste bottle. The isocratic mobile phase is passed through both columns until the columns are equilibrated with the isocratic mobile phase.

Figure 3:
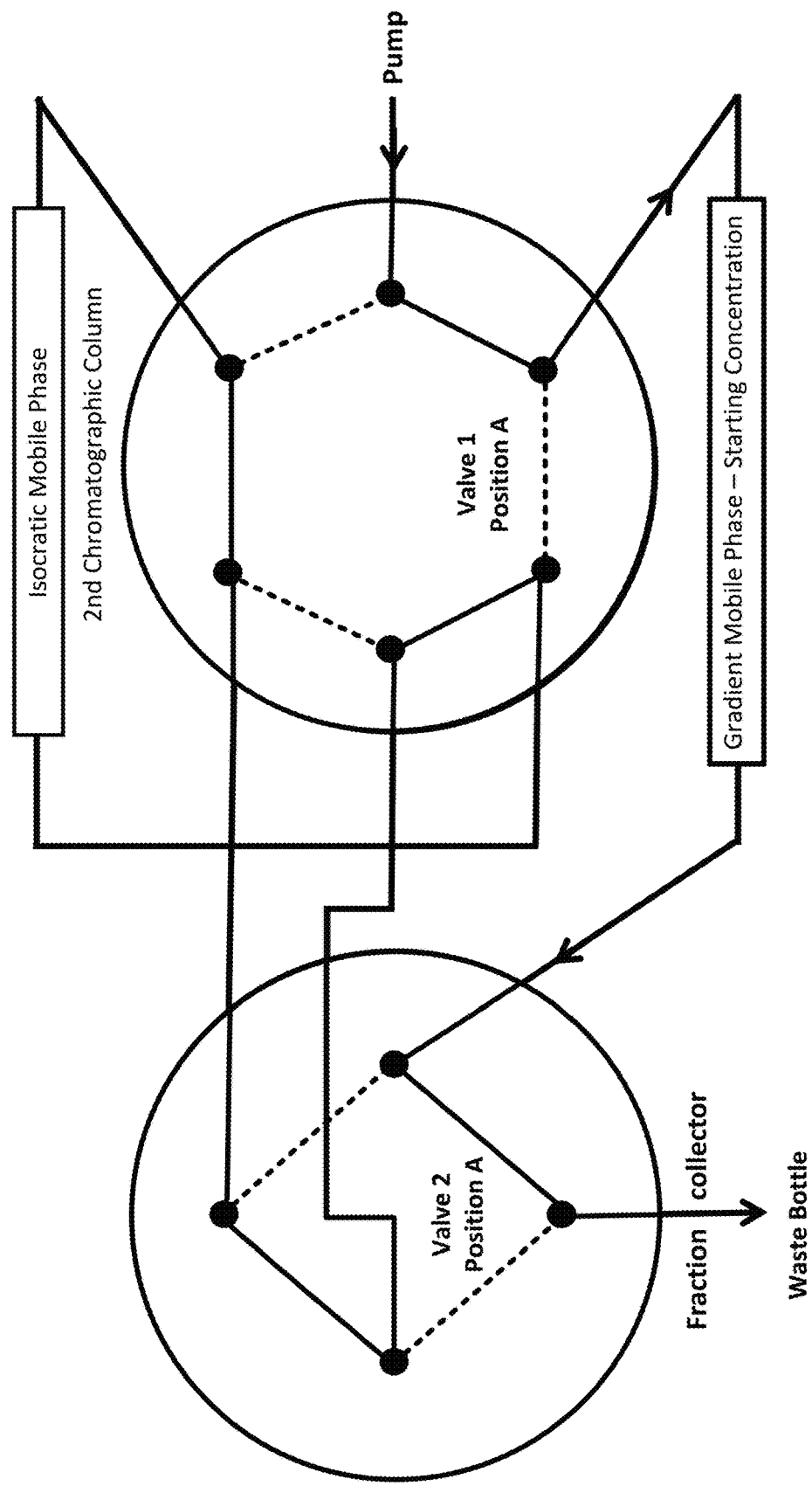
FIG. 3 is a schematic diagram of the positions of Valve 1 and Valve 2 during the equilibration of the first column with the initial gradient mobile phase.

After equilibration of both columns with the isocratic mobile phase stream, the first chromatographic column is prepared for gradient elution of the sample. The second chromatographic column is fluidically isolated from the first chromatographic column, as depicted in FIG. 3. This is done by changing the position of the second valve from position B to position A, while leaving the first valve in position A. An initial gradient mobile phase is sent from the pump, through the first chromatographic column and into the fraction collector where the solvent is collected in a waste bottle. With the positons of the first and second valve selected to fluidically isolate the second chromatographic column from the first chromatographic column, the second chromatographic column remains equilibrated with the isocratic mobile phase. The initial gradient mobile phase is a mixture of two or more solvents at the starting concentration of the gradient mobile phase.

The system is now prepared to receive the sample. The sample is injected into the chromatography system through injection subunit 102 (See FIG. 1). The sample is injected into the initial gradient mobile phase to create a combined flow stream.

Figure 4:
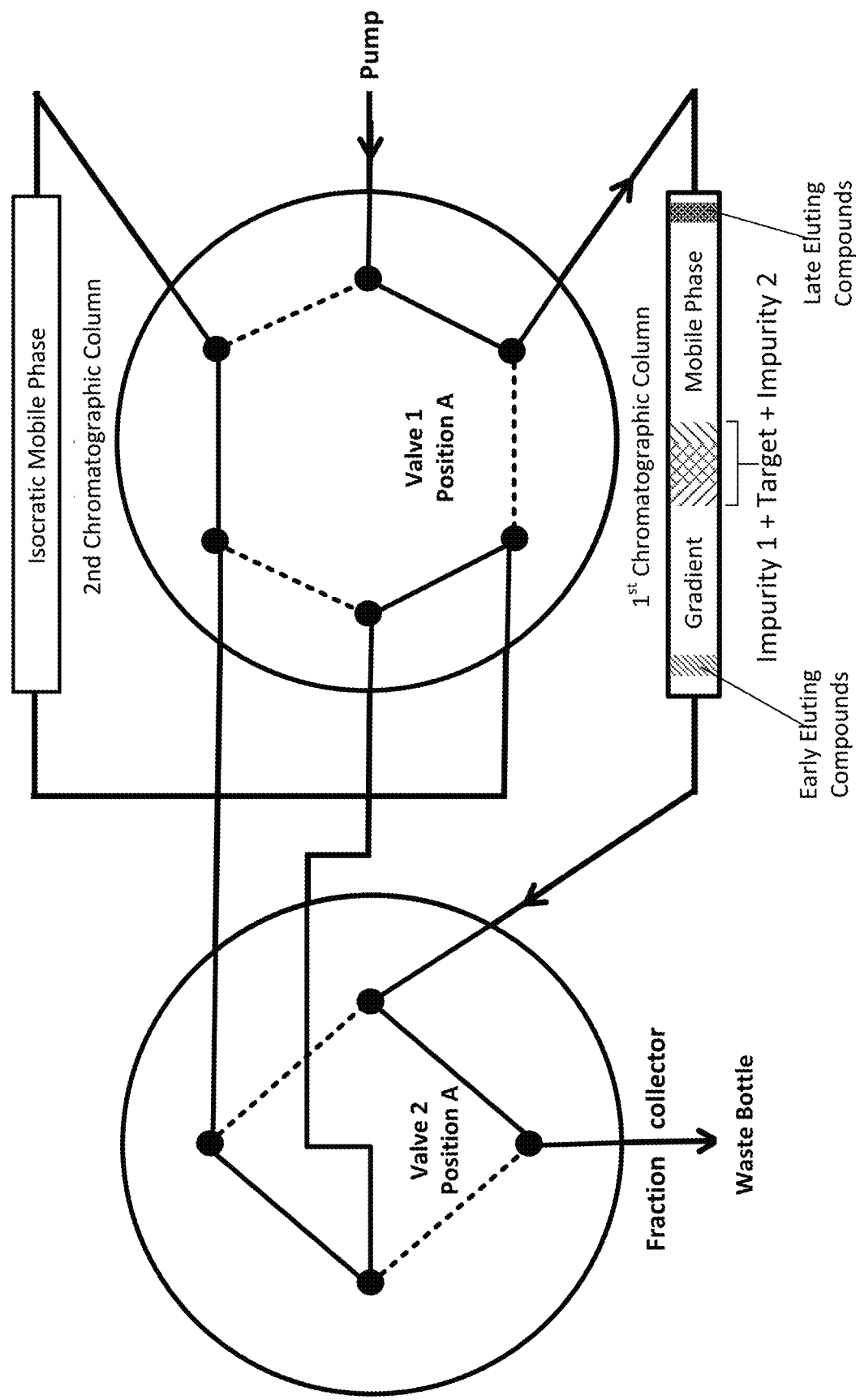
FIG. 4 is a schematic diagram of the positions of Valve 1 and Valve 2 during the initial gradient cleaning of the sample to remove early eluting compounds.

The combined flow stream is passed through the first chromatographic column using a gradient mobile phase, as depicted in FIG. 4. As used herein, the term gradient mobile phase stream is a stream that is composed of a mixture of two or more solvents having a variable volume percentage. During use, the volume percentage of at least one of the components of the gradient mobile phase stream is periodically increased from an initial starting volume percentage (the initial gradient mobile phase) to a final composition volume percentage. For example, a gradient mobile phase of acetonitrile/water may start at a percentage of 80% acetonitrile/20% water initially. During passage of the sample through a chromatographic column with a gradient mobile phase, the percentage is increased, for example from 80% acetonitrile/20% water to 95% acetonitrile/5% water by periodically changing the amount of each component of the solvent. In one embodiment, the gradient mobile phase is changed at a linear rate from a starting composition to a final composition.

FIG. 4 depicts a schematic diagram of the initial pass of the sample through the first chromatographic column using a gradient mobile phase. When, or slightly before, the sample enters the first chromatographic column, the change in the composition of the gradient mobile phase is initiated. The concentration of the solvents in the gradient mobile phase is selected and adjusted while the sample passes through the column so that compounds having a low retention time ("early eluting compounds"), compared to the primary organic compound, separate from the primary organic compound and impurities having a similar elution to the primary organic compound. Also the compounds having a high retention time ("late eluting compounds), compared to the primary organic compound, separate from the primary organic compound and impurities. The gradient mobile phase continues to run, pushing the early eluting compounds out of the column and into the waste bottle, or a fraction collector if there is an interest in saving or analyzing the early eluting compounds.

Figure 5:
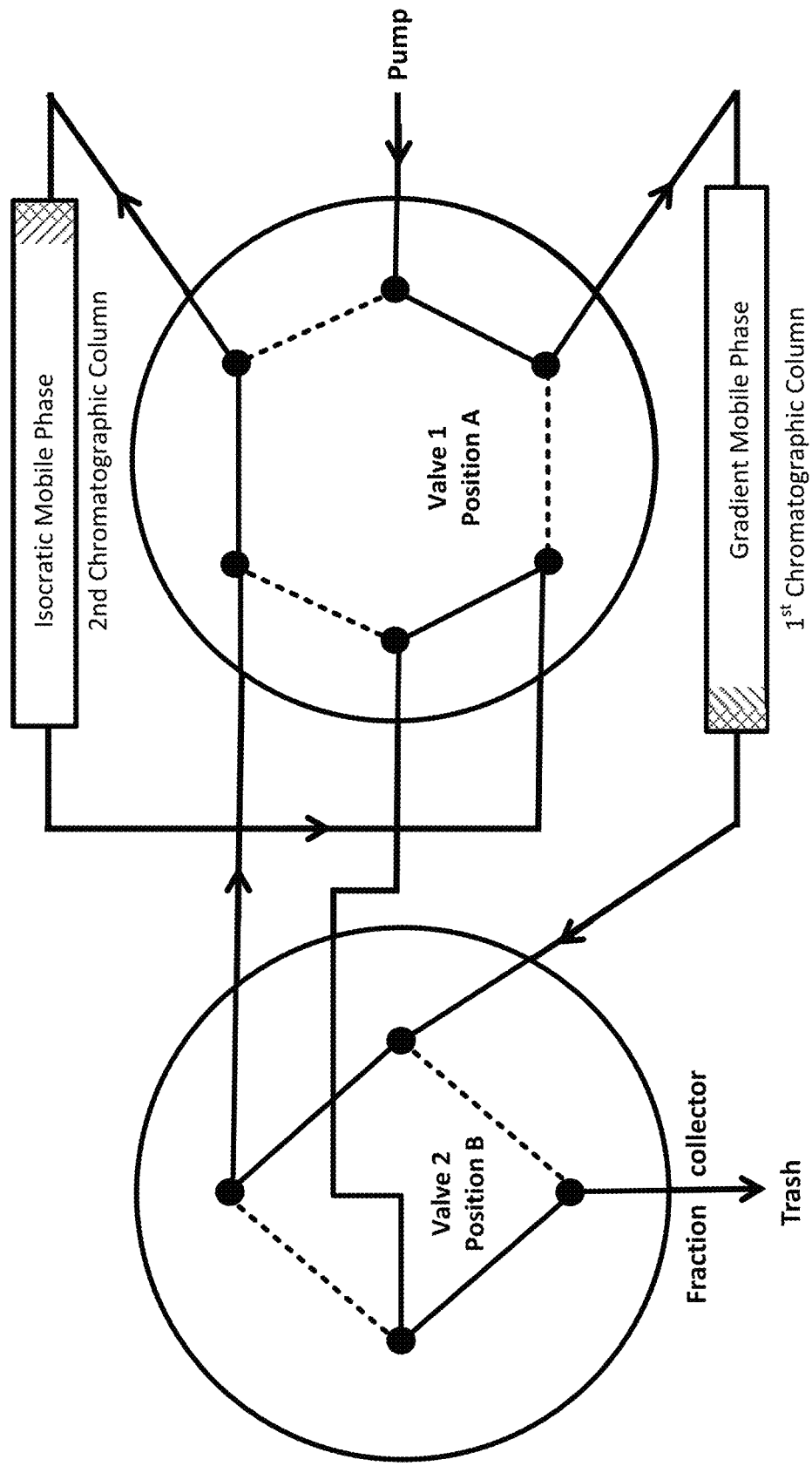
FIG. 5 is a schematic diagram of the positions of Valve 1 and Valve 2 during transfer of the analyte band to column 2 during gradient cleaning of the sample.

FIG. 5 depicts a schematic diagram of the transfer of the organic compound and the associated impurities (the "analyte band") from the first chromatographic column to the second chromatographic column. After the early eluting compounds have been removed from the first chromatographic column, but before the analyte band reaches the end of the column, the second valve is adjusted from position A to position B, while the first valve remains in position A. The analyte band will exit the first chromatographic column and enter the second chromatographic column as shown in FIG. 5.

Figure 6:
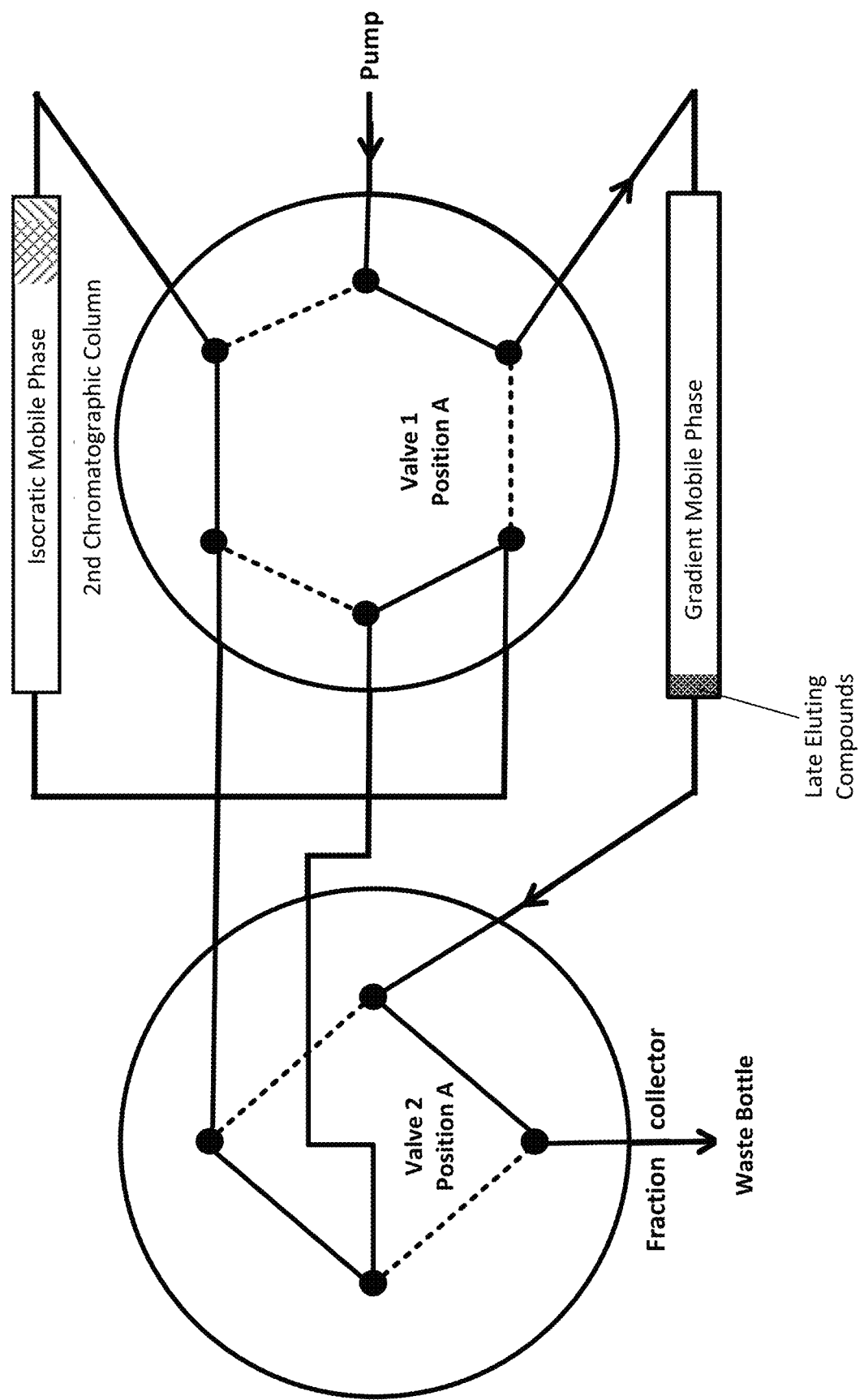
FIG. 6 is a schematic diagram of the positions of Valve 1 and Valve 2 during the final gradient cleaning of the sample to remove late eluting compounds.

After substantially all of the analyte band is transferred to the second chromatographic column, the second chromatographic column is fluidically isolated from the first chromatographic column, as depicted in FIG. 6. The gradient mobile phase continues to flow through the first chromatographic column until the late eluting compounds are removed from the first chromatographic column. The late eluting compounds are transferred out of the first chromatographic column by adjusting the composition of the gradient mobile phase to increase the elution speed of the late eluting compounds. The late eluting compounds are transferred into the waste bottle or a fraction collector if there is an interest in saving or analyzing the late eluting compounds.

Figure 7:
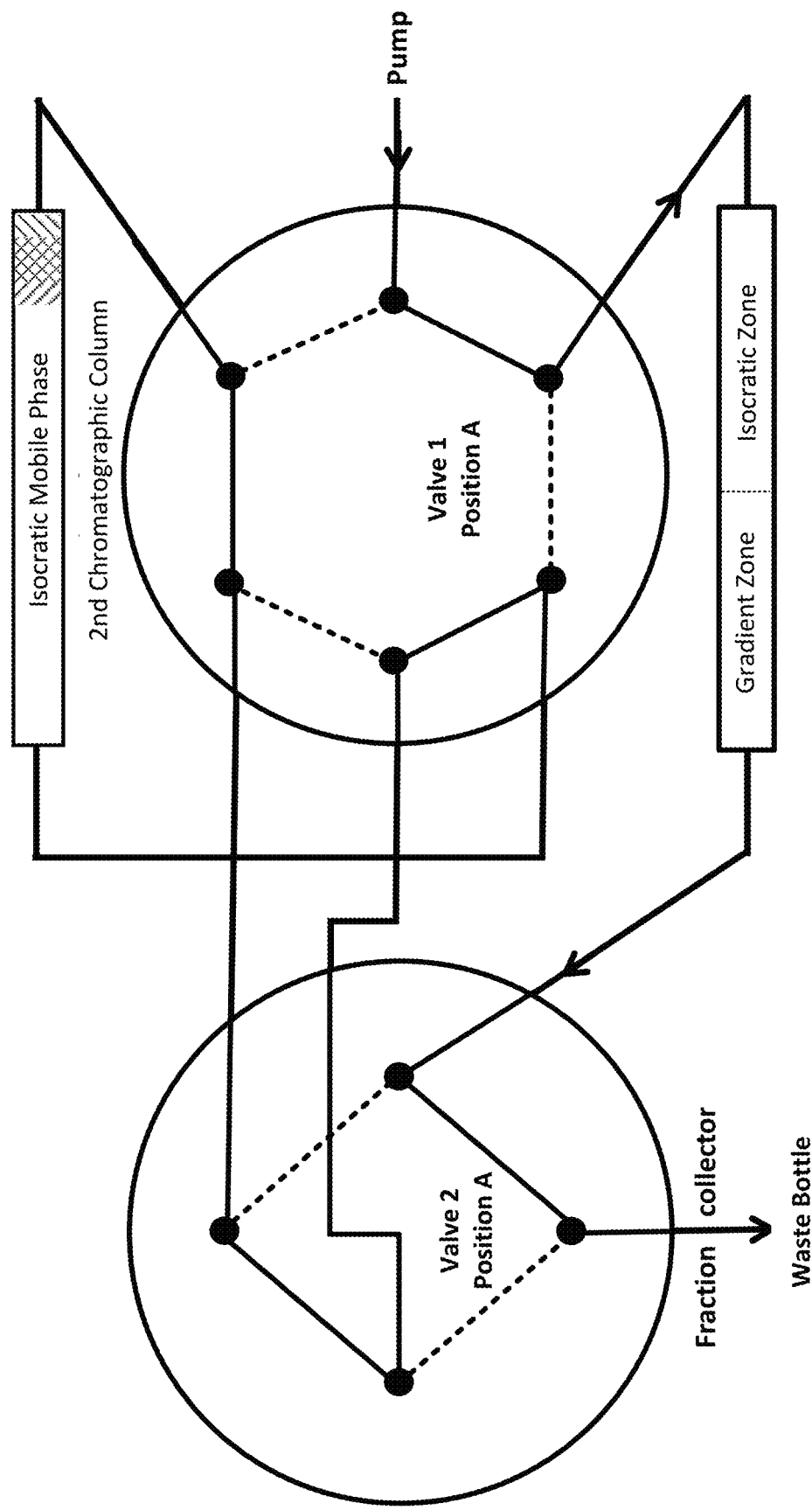
FIG. 7 is a schematic diagram of the positions of Valve 1 and Valve 2 during the equilibration of the first column with the isocratic mobile phase.

After a sufficient amount of late eluting compounds are removed from the first chromatographic column, the first chromatographic column is equilibrated to the isocratic mobile phase in preparation for recycle chromatography. FIG. 7 depicts a schematic diagram of the equilibration of the first chromatographic column with the isocratic mobile phase. For this equilibration, there is no need to change the positions of the valves. The solvent is changed at the pump, so that the isocratic mobile phase replaces the gradient mobile phase. While the first chromatographic column is undergoing equilibration back to the isocratic mobile phase, the second chromatographic column is fluidically isolated from the first chromatographic column. Once the first chromatographic column is equilibrated with the isocratic mobile phase, the recycle chromatography process may be initiated.

Recycle chromatography is performed by recycling the analyte band from the second chromatographic column to the first chromatographic column (e.g., chromatographic columns 126, 124 of FIG. 1, respectively) and from the second chromatographic column to the first chromatographic column until a sufficient resolution (e.g., a baseline resolution) is achieved to separate the one or more impurities from the primary organic compound. This recycle process is shown in FIGS. 8-12.

Figure 8:
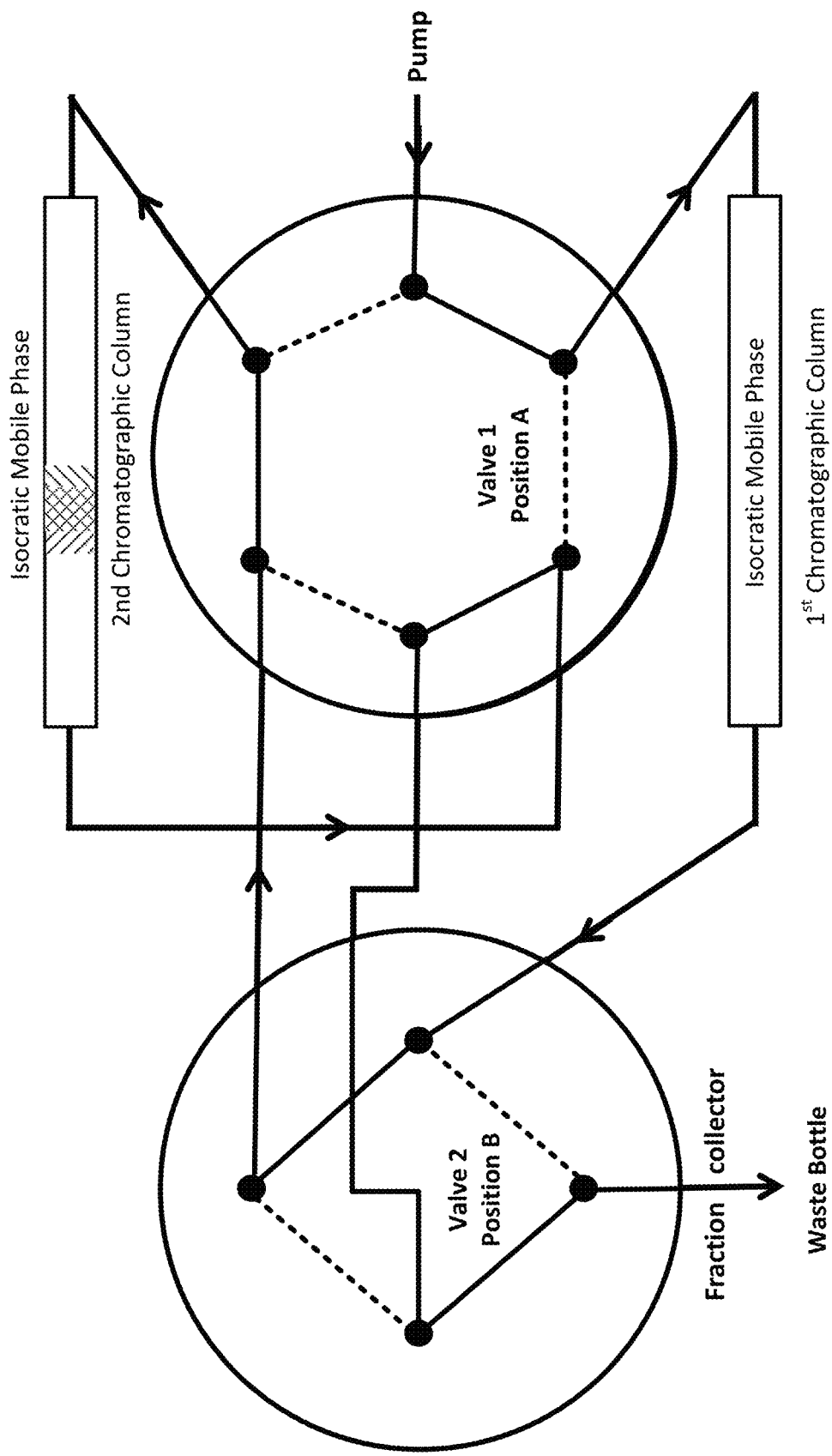
FIG. 8 is a schematic diagram of the positions of Valve 1 and Valve 2 during the initial recycle step.

As shown in FIG. 8, the recycle chromatography sequence begins by reconnecting the second chromatography column to the first chromatography column by adjusting valve 2 from position A to position B, while keeping valve 1 in position A. Flow of the isocratic mobile phase begins through the second chromatographic column, which moves the analyte band through the second column.

Figure 9:
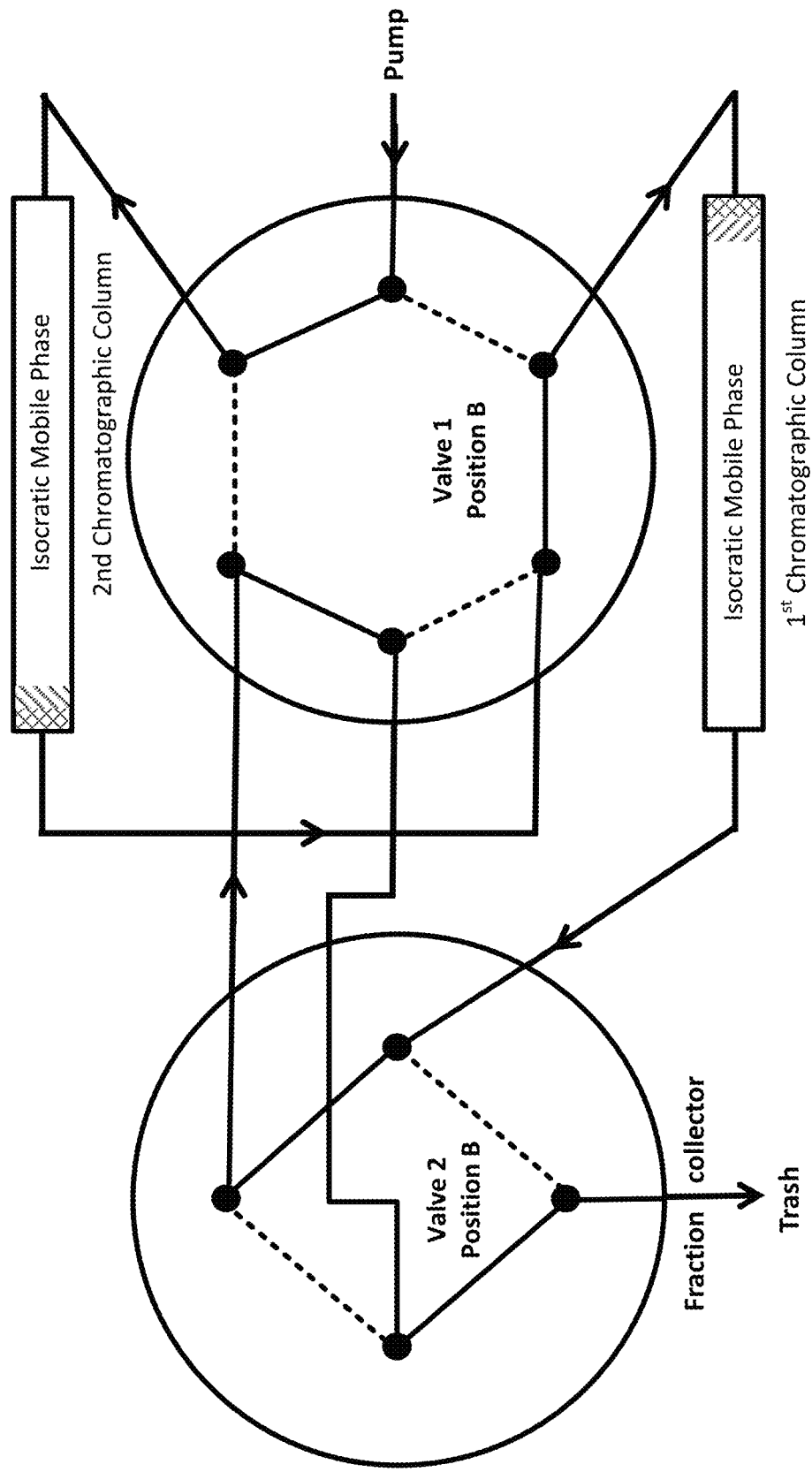
FIG. 9 is a schematic diagram of the positions of Valve 1 and Valve 2 during the transfer of the analyte band from column 2 to column 1, during the recycle phase.

When the analyte band reaches the end of the second chromatographic column, the analyte band is transferred back to the first chromatographic column. FIG. 9 depicts the valve configuration used to transfer the analyte band from the second chromatographic column to the first chromatographic column. Valve 1 is changed from position A to position B, while valve 2 is kept in position B. As shown, the analyte band is transferred to the first chromatographic column.

The number of times the analyte band is passed through each of the columns to achieve the desired separation of the primary organic compound and the impurities may be predetermined before the sample is injected into the chromatography system. The number of cycles can be predetermined by a prior calibration experiment or by calculations known to those of skill in the art. The specific switching times for each valve can then be programed into a timetable of a column manager, which can be used to switch the valves at the requisite times.

Figure 10:
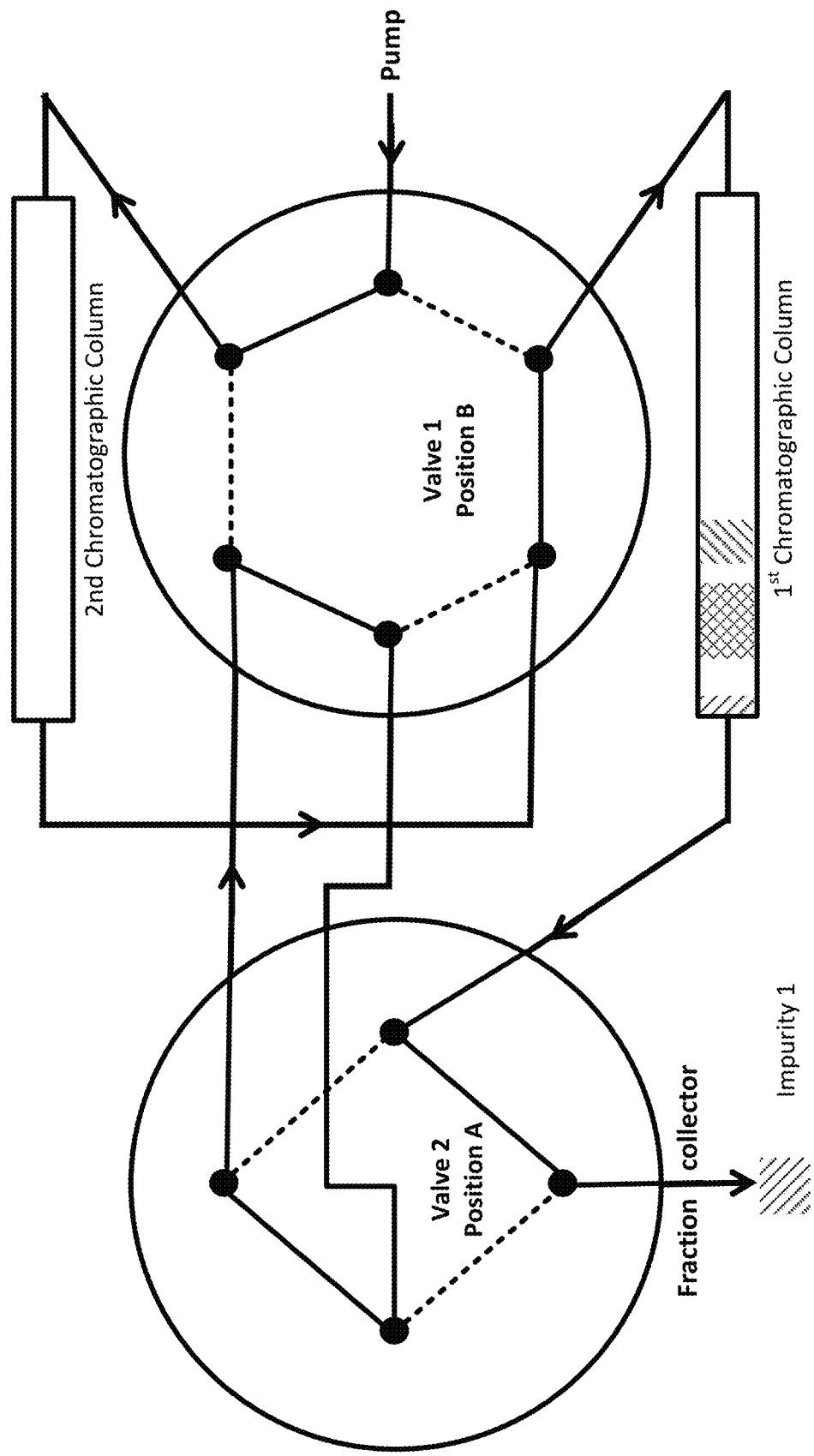
FIG. 10 is a schematic diagram of the positions of Valve 1 and Valve 2 during the collection of the first impurity.
Figure 11:
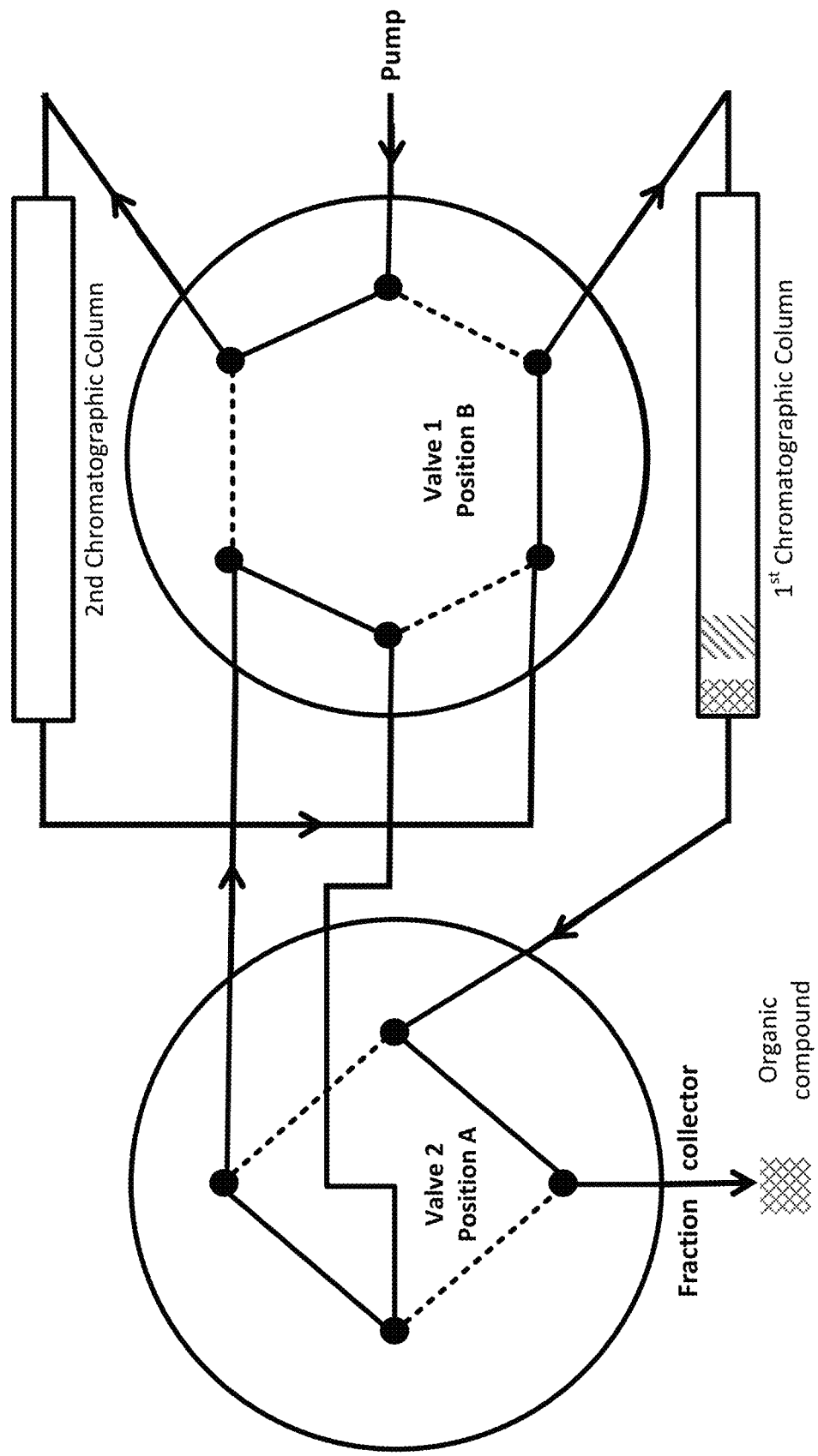
FIG. 11 is a schematic diagram of the positions of Valve 1 and Valve 2 during the collection of the organic compound.
Figure 12:
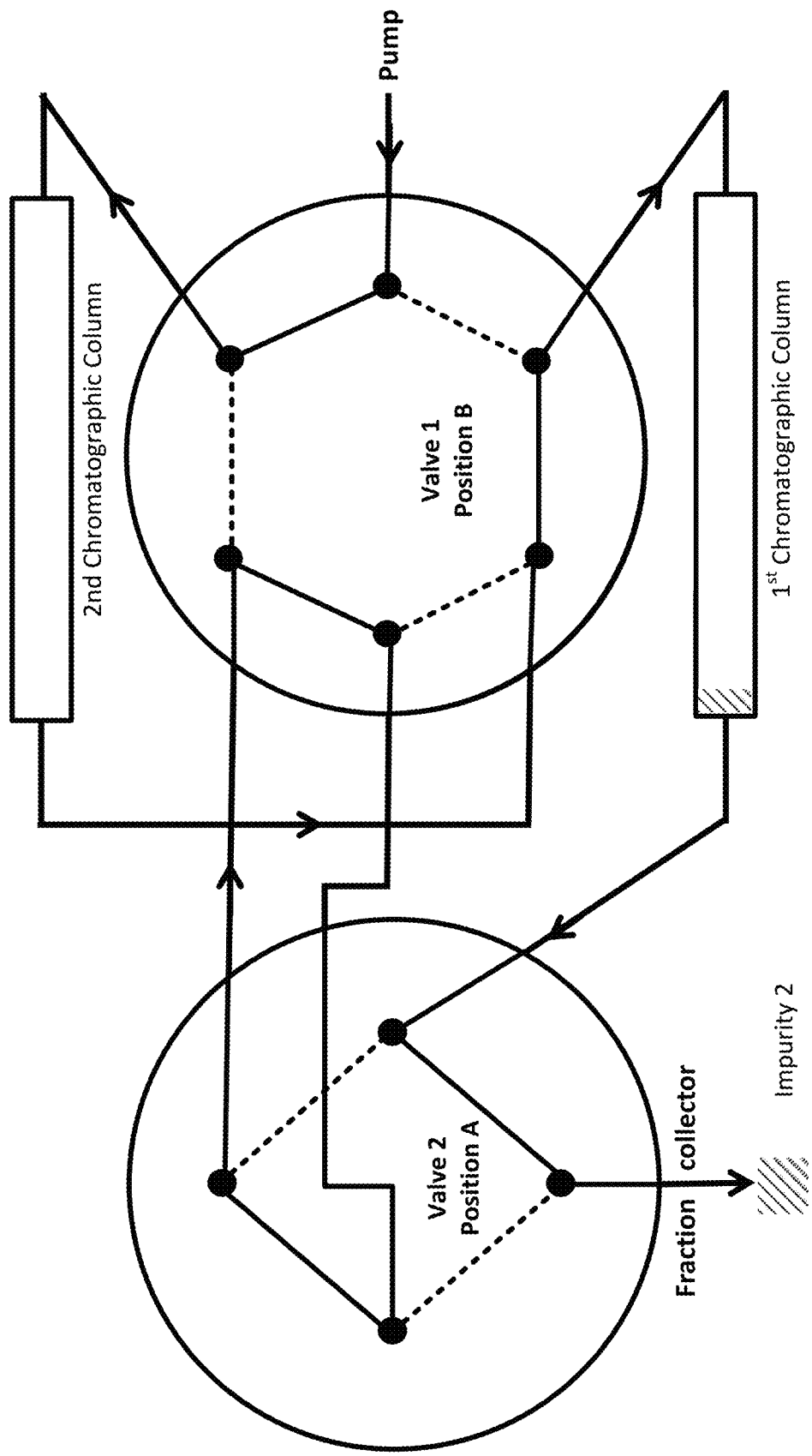
FIG. 12 is a schematic diagram of the positions of Valve 1 and Valve 2 during the collection of the second impurity.

The primary organic compound and the separated impurities are collected at the end of the last cycle. FIGS. 10-12 show the collection of the organic compound and impurities after the last cycle is completed. For collection of the fractions after the recycle process is complete, valve 1 is placed in position B and valve 2 is places in position A. Each fraction is then collected sequentially using a fraction collector. FIG. 10 shows the collection of impurity 1. FIG. 11 shows the collection of the organic compound. FIG. 12 shows the collection of impurity 2.

This method mimics an infinitely long column that can still be operated at optimum velocity and low pressures. The analyte band can be recycled as many times as necessary between the twin columns until the components are separated from each other.

The organic compound and the impurities can be collected in various purities. For example, the collected organic compound and impurities can be 90%, 95% or 99% pure. In some embodiments the collected organic compound and collected impurities are 91%, 92%, 93%, 94%, 95%, 96%, 97%, or 98% pure. In one embodiment, for example when chemical structure elucidation is required using NMR, the fraction collector collects about 1 mg of impurity at a purity level of at least about 90%.

Moreover, in the method described above, about 100% yield if obtained, i.e., about all the injected mass of the impurity is collected. In some embodiments, the yield of the impurity is 95%, 96%, 97%, 98% or 99%.

The systems and methods described herein combine ultra-high resolution performance (for the separation of an unknown trace impurity that is nearly co-eluting with the primary organic compound) and semi-preparative capabilities (for the preparation of a predetermined quantity (e.g., 1 mg) of a trace impurity). Additionally, the systems and methods remove any undesirable problems encountered in preparative chromatography, including (1) the mismatch between the elution strength of the sample diluent and that of the eluent, which causes severe band distortion and loss of band resolution, and (2) the mismatch between the viscosity of the sample diluents and that of the eluent, which causes distorted and irreproducible band shapes leading to weak process robustness and resolution loss.

The systems and method described herein can be used for the challenging separation and preparation of small amount (about 1 mg) of low-abundant isotopes, enantiomers, isomers, polymers, and aggregates of monoclonal antibodies. The systems and methods can be applied at different preparative scales (from about 2.1 mm to 3 cm inner diameter columns) and for any chromatography retention modes (for example, reverse phase liquid chromatography, normal phase liquid chromatography, hydrophilic interaction liquid chromatography, or size exclusion chromatography) and for any physical state of the mobile phase (for example, gas, liquid, or supercritical fluid (e.g., carbon dioxide)).

The technology described herein can be used to clean a sample from all its early (eluting before the sample) and late (eluting after the sample) impurities, while allowing also allowing for the separation of the closely eluting components of interest.

Example 1 (Theoretical)

In this example the elution times and sequence of timings for valve position changes is optimized from a theoretical viewpoint.

In order to predict the elution times and the axial positions of the front and rear parts of the analyte band profile during gradient twin column recycling liquid chromatography ("GTCRLC"), the sample thermodynamic information is needed. This means that the variation of the retention factor as a function of the volume fraction of the strong solvent should be accurately estimated. A few scouting gradient experiments are then applied for a few distinct gradient times $t_g$.

The gradient of the strong eluent is programmed to be linear at the column inlet. Additionally, the gradient profile along the column is assumed to be non-retained and not distorted. Accordingly, the volume fraction, $\varphi(z, t)$, of the strong solvent at any variable time t and position z along the column is given by:

$$\varphi(z, t) = \varphi_0 + \beta\left(t - \frac{z}{u_0}\right) \qquad (1)$$

where $\varphi_0$ is the volume fraction of the strong solvent before the gradient starts, $u_0$ is the chromatographic linear velocity, and $$\beta = \frac{\varphi L - \varphi 0}{t_g}$$

is the temporal gradient steepness. $\varphi_L$ is the final volume fraction of the strong solvent at the end of the gradient.

Let k(0) be the initial retention factor for $\varphi=\varphi_0$. Accordingly, the exact expression of the gradient retention time, $t_{R,g}$, assuming Neue's curved retention model (three model parameters $k_0$, S, and a) and for the system dwell time $t_D$ is written:

$$t_{R,g} = t_0 + t_D + \frac{1}{S\beta} \frac{(1 + a\varphi_0)^2 \ln\left(1 + S\beta k_0 \exp\left[-\frac{S\varphi_0}{1 + a\varphi_0}\right]\left[t_0 - \frac{t_D}{k(0)}\right]\right)}{1 - a\frac{1 + a\varphi_0}{s}\ln\left(1 + S\beta k_0 \exp\left[-\frac{S\varphi_0}{1 + a\varphi_0}\right]\left[t_0 - \frac{t_D}{k(0)}\right]\right)} \qquad (2)$$

where $t_0$ is the column hold-up time, $t_D$ is the dwell time, and k(0) is the retention factor at the beginning of the gradient given by:

$$k(0) = k_0(1 + a\varphi_0)^2 \exp\left[-\frac{S\varphi_0}{1 + a\varphi_0}\right] \qquad (3)$$

In practice, four significantly different gradient steepness are applied ($t_g$=2$t_0$, 6$t_0$, 18$t_0$, and 54$t_0$). A very small sample volume (which depends on the column size) and low sample concentrations are injected to record four chromatograms under strict linear chromatographic conditions and in the absence of column volume overload. For any compound present in the sample mixture, four different gradient retention times, $t_{R,g,1}$, $t_{R,g,2}$, $t_{R,g,3}$, and $t_{R,g,4}$ are measured. The best model parameters $k_0$, S, and a are then unambiguously estimated by minimizing the sum of the relative residuals squared between measured and calculated (Eq. 2) gradient retention times.

The automation of the GTCRLC process consists of determining unambiguously in advance the initial gradient method, the mobile phase composition during the standard isocratic recycling process, and the times at which both the two-position valves 1 and 2 involved in the GTCRLC system should be actuated.

Initial Gradient Run on Twin Column 1

Knowing the system dwell time, $t_D$, and the column hold-up time $t_0$, the two characteristics (starting gradient mobile phase composition, $\varphi_0$, and the temporal gradient slope, $\beta$, of the applied linear gradient) are unambiguously determined so that the gradient retention times of the first and last eluted compounds in the sample mixture are set to $$t_{R,g,1} = t_D + k_1 t_0$$

and $$t_{R,g,last} = \frac{\varphi L - \varphi 0}{\beta},$$

respectively. $k_1$ is arbitrarily set to a small value around 1.5 but may vary depending on the application. $\varphi_L$ is set to 1 for the highest possible elution strength but may vary depending on the application. At $t_1 = t_{R,g,last} - t_D - t_0$, the mobile phase composition delivered by the pump is suddenly changed from $\varphi_0 + \beta t_1$ to $\varphi_{recycling}$, the constant volume fraction of the strong solvent applied during the next isocratic recycling steps.

The temporal width of the gradient elution zone, which contains the targeted compound mixed with fractions of the closest early and late impurities, is directly set by the experimenter who makes sure that the entire mass of the targeted compound will eventually be recycled and collected at the end of the GTCRLC process. This defines the two times, $t_{start}$ (actuation #1 of valve 1) and $t_{end}$ (actuation #2 of valve 1), when the transfer of this elution zone from one to the other twin column starts and ends, respectively. The twin column involved in the initial gradient step is then flushed and pre-equilibrated with the recycling mobile phase from $t_1$ to $t_2 = t_{R,g,last}$ (actuation #3 of valve 1), when the recycling process starts.

First Isocratic Cycle on Twin Column 2

The retention factor of the target compound is set to $k_{recycling}$ during the recycling method. The corresponding volume fraction of the strong eluent, $\varphi_{recycling}$, is determined from Neue's curved retention model and from the best model parameters obtained for this compound. It is important to keep in mind that a large sample volume has been injected into the first twin column. Therefore, a significantly large gradient volume has to be transferred from $t_{start}$ to $t_{end}$ relative to the column hold-up volume. During the transfer, a gradient of mobile phase composition enters the second twin column. Once the transfer is complete and the flow along the second column is set back to zero, the rear of the analyte band is assumed to be located at $z_{R,1} = 0$ while the front of the band has migrated up to the position $z_{F,1}$ under strict gradient condition. $z_{F,1}$ is then the solution of the following equation that is numerically solved:

$$t_{end} - t_{start} = \frac{z_{F,1}}{L} t_0 + \frac{1}{S\beta} \frac{(1+a\varphi_{start})^2 \ln\left(1 + S\beta k_0 \exp\left[-\frac{S\varphi_{start}}{1+a\varphi_{start}}\right]\frac{z_{F,1}}{L} t_0\right)}{1 - a\frac{1+a\varphi_{start}}{s}\ln\left(1 + S\beta k_0 \exp\left[-\frac{S\varphi_{start}}{1+a\varphi_{start}}\right]\frac{z_{F,1}}{L} t_0\right)} \quad (4)$$

where $\varphi_{start} = \varphi_0 + \beta(t_{start} - t_D - t_0)$.

From $t_2$ to $t_3$ (to be determined), the front of the isocratic eluent train (the volume fraction of the strong eluent is $\varphi_{recycling}$) enters the second twin column and is catching up with the front of the analyte band which is still migrating under strict gradient conditions from position $z_{F,1}$ to $z_{F,2}$. $t_3$ and $z_{F,2}$ are solutions of these the following two equations:

$$t_3 - t_2 = \frac{z_{F,2}}{L} t_0 \quad (5)$$

for the position of the front of isocratic eluent train and $$t_3 - t_2 + t_{end} - t_{start} = \frac{z_{F,1}}{L} t_0 + \frac{1}{S\beta} \frac{(1-a\varphi_{start})^2 \ln\left(1 + S\beta k_0 \exp\left[-\frac{S\varphi_{start}}{1+a\varphi_{start}}\right]\frac{z_{F,1}}{L} t_0\right)}{1 - a\frac{1+a\varphi_{start}}{s}\ln\left(1 + S\beta k_0 \exp\left[-\frac{S\varphi_{start}}{1+a\varphi_{start}}\right]\frac{z_{F,1}}{L} t_0\right)} \quad (6)$$

for the position of the front of the analyte band.

At time $t_3$, the position, $z_{R,2}$, of the rear of the analyte band which has migrated under strict isocratic conditions is given by:

$$z_{R,2} = L\frac{t_3 - t_2}{(1 + k_{recycling})t_0} \quad (7)$$

where $k_{recycling}$ is given by:

$$k_{recycling} = k_0(1 + a\varphi_{recycling})^2 \exp\left[-\frac{S\varphi_{recycling}}{1+a\varphi_{recycling}}\right] \quad (8)$$

Finally, from $t_3$ to $t_4$ (to be determined), the front of the analyte band reaches the outlet of the second column ($z_{F,3} = L$) while its rear advances up to the position $z_{R,3}$ under strict isocratic conditions. Accordingly, $t_4$ is given by $$t_4 - t_3 = \left(1 - \frac{z_{F,2}}{L}\right)(1 + k_{recycling})t_0 \quad (9)$$

for the position of the front of the isocratic eluent train and $$z_{R,3} = z_{R,2} + L\frac{t_4 - t_3}{(1 + k_{recycling})t_0} \quad (10)$$

for the position of the rear of the analyte band.

Second Isocratic Cycle on Twin Column 1

At time $t_4$, the analyte band starts exiting the second column and enters the first column, which is fully equilibrated with the isocratic eluent. At time $t_5$ (to be determined), the center of the analyte band is located in the middle of the first column, that is, at the location $$z_{C,4} = \frac{L}{2}.$$

The locations, $z_{F,4}$ and $z_{R,4}$, of the front and rear, respectively, of the analyte band are then given by $$z_{F,4} = \frac{L}{2} + \frac{L - z_{R,3}}{2} \quad (11)$$

for the position of the front of the analyte band, and $$z_{R,4} = \frac{L}{2} - \frac{L - z_{R,3}}{2} \quad (12)$$

for the position of the rear of the analyte band. Accordingly, $t_5$ is given by $$t_5 - t_4 = \frac{z_{F,4}}{L}(1 + k_{recycling})t_0 \quad (13)$$

At time $t_5$, valve 2 is switched to prepare for transfer of the analyte band from the second to the first column.

Third and Subsequent Isocratic Cycles on Twin Columns 1 and 2

At time $t_6$, the center of the analyte band is located in the middle of the second column and valve 2 is switched to prepare for the transfer of the analyte band from the second to the first twin column. The time $t_6$ is given by $$t_6 - t_5 = (1 + k_{recycling})t_0 \quad (14)$$

The very same analyte transfer process is then repeated until the penultimate $(n-1)^{th}$ isocratic cycle for which the last switching time, $t_{n+2}$, of valve 2 is given by $$t_{n+2} - t_{n+1} = (1 + k_{recycling})t_0 \quad (15)$$

A total of n isocratic cycles are then completed before collection of the pure target compound. n is experimentally determined and based, in some embodiments, on complete baseline separation between the primary organic compound and the closest early and late impurities.

Collection of the Targeted Compound

After a total of n isocratic cycles, the elution times of the front and rear parts of the band of the targeted compound are:

$$t_{c,F} = t_{n+2} + \left(1 + \frac{1}{2}\left[1 - \frac{z_{F,2} - z_{R,2}}{L}\right]\right)t_0 \quad (16)$$

for the front part and $$t_{c,R} = t_{n+2} + \left(1 + \frac{1}{2}\left[1 + \frac{z_{F,2} - z_{R,2}}{L}\right]\right)t_0 \quad (17)$$

for the rear part. At the same time, the front and rear parts of the band have been smoothed due to dispersion as these boundaries are migrating through n column lengths. Let N be the efficiency of a single twin column. Considering a $3\sigma$ dispersion around the front and rear parts of the band (or 99.7% of the mass collected, assuming a perfect Gaussian profile), the starting and ending collection times are then predicted to be:

$$t_{c,start} = t_{c,F} - 3\sqrt{\frac{n}{N}}(1 + k_{recycling})t_0 \quad (18)$$

for the front part and $$t_{c,end} = t_{c,R} - 3\sqrt{\frac{n}{N}}(1 + k_{recycling})t_0 \quad (19)$$

for the rear part.

Automation: Pump and Valves Programs

The complete automation of the GTCRLC process consists of tabulating the temporal events for the solvent manager (programmed changes in the volume fraction of the strong solvent during the process) and the two-column manager (programmed positions of valves 1 and 2). From a general viewpoint, the volume fraction (% B) of the strong solvent in the mobile phase and the positions (A or B) of the two-position valves 1 and 2 are listed in Table 1 as a function of time. The time origin is when the sample volume, $V_p$, starts being delivered into the twin column 1 for the initial gradient run. This timetable is unique and built from the previously determined parameter $\varphi_0$, $\beta$, $t_{start}$, $t_{end}$, $\varphi_{recycling}$, $t_1, t_2, t_5, t_6, \ldots, t_{n+1}, t_{n+2}, t_{c,start}$, and $t_{c,end}$. In Table 1, $\varepsilon$ is the smallest time increment to be set physically. The position of valve 2 during collection depends on the parity of n: A if n is even, B if n is odd.

TABLE 1

| # of isocratic cycles completed | Time event | % B Strong solvent | Valve 1 position | Valve 2 position |
|---|---|---|---|---|
| 0 (inject start) | 0.00 | $\varphi_0$ | A | A |
| 0 (transfer start) | $t_{start}$ | $\varphi_0 + \beta t$ | A | B |
| 0 (transfer end) | $t_{end}$ | $\varphi_0 + \beta t$ | A | A |
| 0 (gradient end) | $t_1$ | $\varphi_0 + \beta t$ | A | A |
| 0 (isocratic start) | $t_1 + \varepsilon$ | $\varphi_{recycling}$ | A | A |
| 0 (recycling start) | $t_2$ | $\varphi_{recycling}$ | B | B |
| 2 | $t_5$ | $\varphi_{recycling}$ | A | B |
| 3 | $t_6$ | $\varphi_{recycling}$ | B | B |
| ... | ... | $\varphi_{recycling}$ | ... | ... |
| n-2 | $t_{n+1}$ | $\varphi_{recycling}$ | A or B | B |
| n-1 | $t_{n+2}$ | $\varphi_{recycling}$ | A or B | B |
| n (collect start) | $t_{c,start}$ | $\varphi_{recycling}$ | A | A or B |
| n (collect end) | $t_{c,end}$ | $\varphi_{recycling}$ | A | A or B |

Example 2 (Experimental)

Recycling Experiments

Chemicals: The mobile phases were mixtures of either acetonitrile and water or methanol and water. All three solvents were Optima grade from Fisher Scientific (Fair Lawn, NJ, USA). Vitamins A, D2, D3, 231 and E (purity>96%) were purchased from Millipore Sigma (St. Louis, Groton, CT, USA).

Instrumentation: All the experimental data were acquired on a slightly modified the Arc System (Waters, Milford, MA, USA). The standard configuration of the instrument includes a multi-solvent delivery system (quaternary solvent manager), a gradient proportioning valve (GPV), a primary and accumulator pump heads (selected stroke volume of 132 µL for any ow rates up to 5.0 mL/min), a two-paths flow mixer (path 1: 333 µL packed beads mixer, 4.6 mm×50 mm column; path 2: 675 µL packed beads mixer, 4.6 mm×100 mm column), an auto-sampler equipped with a 30 µL sample loop and four 250 µL extended sample loops connected in series, a two-column selection valve, a two-column semi-adiabatic oven, and a single wavelength transmission UVdetector (8 µL cell volume). The instrument is run by the Empower 3 Chromatography Data Software (Waters, Milford, MA, USA). The extra-column volumes are 0.048 mL from the auto-sampler needle seat to the UV cell. All measurements were carried out at room temperature (296±1 K).

The dwell volume of the Arc instrument is measured in presence of the path 2 mixer and of the RPLC chromatographic column used in this work. The experimental protocol is as follows: the flow rate is set at $F_v$=2.5 mL/min. The column is first equilibrated at T=27° C. with a mobile phase mixture containing 75% (v/v) acetonitrile. The system pressure is measured at Pstart=1039 psi. Next, a 75-to-55% (v/v) linear gradient of acetonitrile is applied during $t_g$=3$t_0$=5.37 min and the column is finally equilibrated with a mobile phase mixture containing 55% (v/v) acetonitrile up to t=10 min. The final system pressure is measured at $P_{end}$=1423 psi. The rationale for such acetonitrile gradient is that 1) the viscosity of the eluent mixture increases quasi-linearly with decreasing the acetonitrile volume fraction from 75 to 55% and 2) the acetonitrile gradient is neither retained nor distorted upon propagation along the RPLC column over this concentration range. As a result, the profile of the system pressure is quasi-linearly increasing with time. This pressure profile is recorded from t=0 (gradient start) to t=10 min (run end). The time $t_1$=2 at which the system pressure is exactly $$\frac{P_{start} + P_{end}}{2} = 1231$$

psi is measured. The dwell volume of the instrument is then directly determined by:

$$V_{dwell} = F_v \left( t_{1/2} - \frac{t_g + t_0}{2} \right) \quad (20)$$

where $t_0$=1.79 min is the hold-up time of the column. Accordingly, the dwell volume of the Arc instrument was measured at $V_{dwell}$=1.66 mL.

Columns: The two chromatographic columns used in this work are 7.8×150 mm columns packed with 3.5 µm Sunfire-C18 fully porous particles (100 Å pore size). Both columns were packed on-site (Waters, Milford, USA). The column hold-up volume of 1.79 mL (total porosity 62.4%) was estimated from the retention time of thiourea using a mixture of water and acetonitrile (85/15, v/v) as the mobile phase.

Separation of a PAH Mixture: A PAH mixture was ordered from and prepared by Chem Service, Inc (West Chester, PA, USA). This PAH mixture contains 10 analytes: naphthalene (purity>99.5%), phenanthrene (purity>234 99.3%), anthracene (purity>99.0%), triphenylene (purity>99.4%), chrysene (purity>99.4%), 1,2-Benzanthracene (purity>99.5%), pyrene (purity>98.5%), Benzo(a)pyrene (purity>99.5%), coronene (purity>98.9%), and 1,12-Benzoperylene (purity>99.3%) all dissolved in pure acetonitrile. Their concentrations are certified to be 100.8, 100.7, 100.8, 100.2, 101.5, 101.0, 100.5, 100.0, 100.9, and 100.5 µg/mL, respectively. Under the isocratic mobile phase analysis conditions chrysene nearly co-elutes with triphenylene and benzo[a] anthracene.

The flow rate was fixed at 2.5 mL/min, the two-column oven and the two active solvent preheaters were set at a fixed temperature of 55° C. The injected sample volume was fixed at 1000 µL. Prior to starting the process, the chromatographic column 2 is first equilibrated for 15 min with the isocratic mobile phase mixture of acetonitrile and water (83.2/16.8, v/v) while valves 1 is in position A and valve 2 is in position B. Valve 2 is switched to position A and the chromatographic column 1 is equilibrated for 15 min with the initial gradient mobile phase, a mixture of acetonitrile/water eluent mixture (88.1/11.8, v/v). The concentration of the strong solvent (in this case, acetonitrile), after injection of the sample, is linearly increased from 88.1% acetonitrile to 96.2% acetonitrile during a period of 5.32 min. At that time, the same volume fraction of acetonitrile is suddenly decreased from 96.2% acetonitrile to 83.2% acetonitrile allowing for the equilibrium of chromatography column 1 before the recycling process starts at time t=7.78 min.

Figure 13:
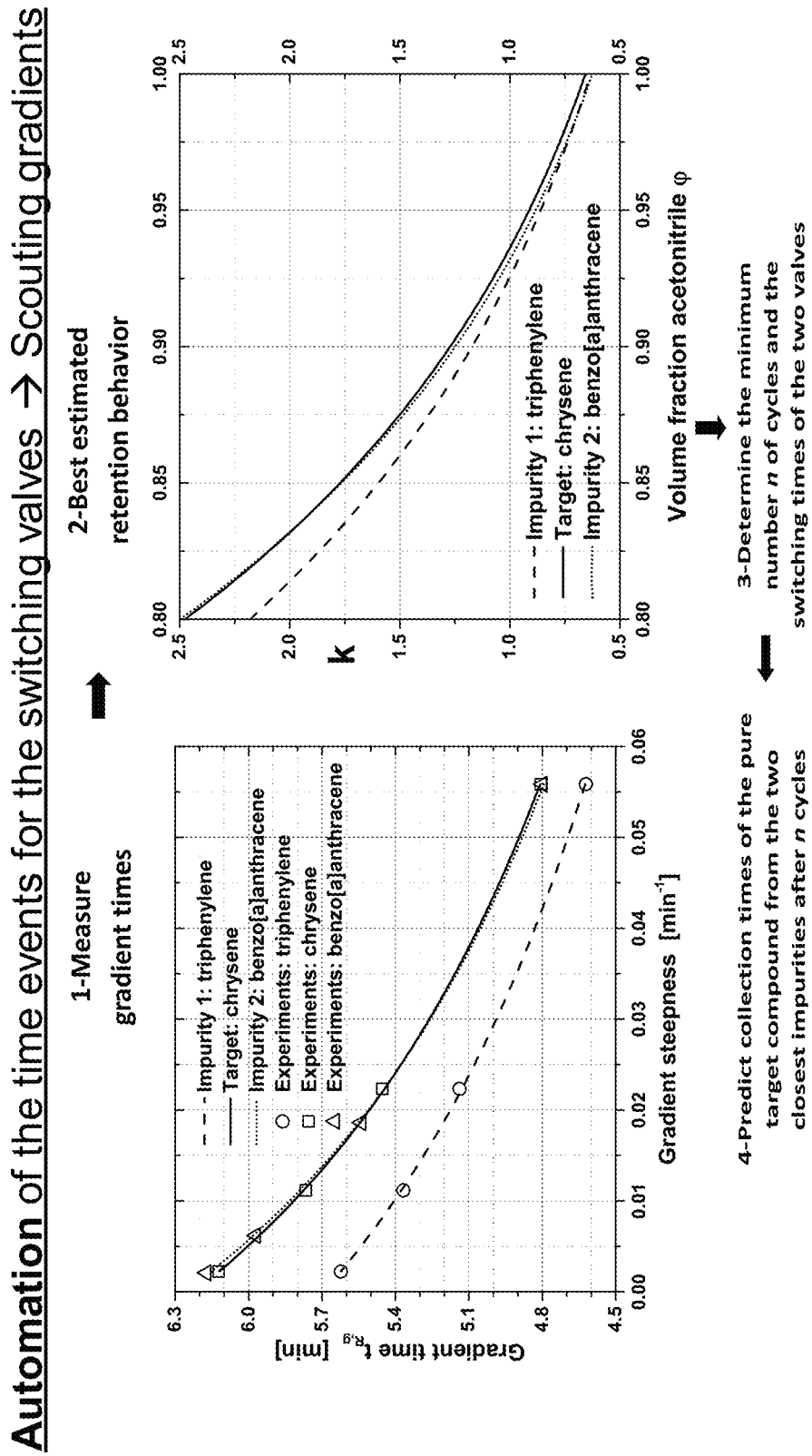
FIG. 13 depicts graphs and steps in an exemplary scouting experiment for determining valve switching time and collection times.

Scouting gradients are used to determine the timing of the valve position changes for the recycle process. FIG. 13 depicts data used to determine the automation time events for the switching of the valve. In step 1 the gradient time of the target or primary organic compound, chrysene and the near co-eluting impurities (Impurity 1, triphenylene and Impurity 2 benzo[a]anthracene) are measured at various gradient steepness. In step 2, the gradient time in relation to the gradient steepness can be used to generate a graph of the gradient retention factor (k) vs. the concentration of the strong solvent (acetonitrile). In step 3, based on this information, the number of cycles needed during the recycle phase of the process can be determined, as well as the timing of the valve position changes during the recycle process. Finally, in step 4, the collection time of the target organic compound can be determined. All the events regarding the mobile phase composition and the positions of valves 1 and 2, for the separation of our PAHs are listed in Table 2 as a function of time. This table is used to automate the entire GTCRLC process for the isolation and baseline separation of chrysene from two nearly co-eluting PAHs, triphenylene and benzo [a] anthracene.

Figure 14:
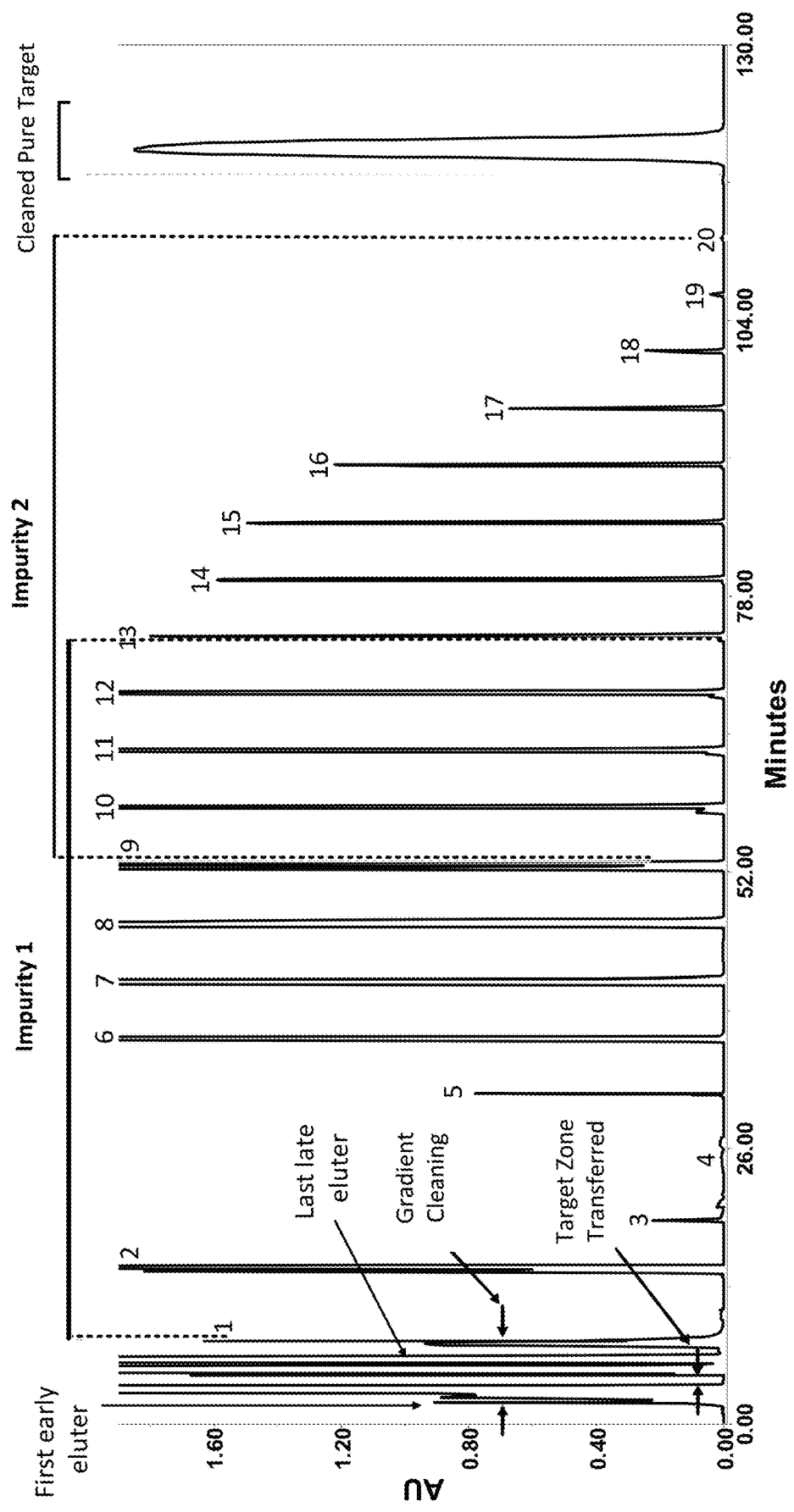
FIG. 14 shows a chromatogram of the measurement of the retention times of during a gradient twin column recycling liquid chromatography test used to separate a mixture of polyaromatic hydrocarbons.

FIG. 14 depicts a test run using the mixture of 10 PAHs described above. After sample injection, the concentration of acetonitrile is linearly increased from 88.1% acetonitrile to 96.2% acetonitrile during a period of 5.32 min. Early eluting PAHs were removed from the chromatographic system from 0 to 3.63 minutes. Chrysene, triphenylene and benzo[a] anthracene was transferred as an analyte band to the second chromatographic column from 3.63 minutes to 4.60 minutes. Late eluting PAHs were removed from the chromatography system from 4.60 minutes until 5.32 minutes, while the analyte band was parked at on the second chromatographic column. At 5.32 minutes, the solvent is switch to the isocratic mobile phase of 83.2% acetonitrile, and the first chromatographic column is equilibrated until 7.78 minutes. At 7.78 minutes the recycle process is initiated by passing the analyte band through the second chromatographic column. The analyte band passes between the first and second chromatographic columns for 20 cycles. At the end of each cycle, some of the impurities (triphenylene and benzo[a] anthracene) are removed from the chromatography system. During the first 8 cycles the faster moving impurity, triphenylene, is removed. During cycles 9-13 both impurities, triphenylene and benzo[a]anthracene are removed. As can be seen in FIG. 14, the peak associated with triphenylene becomes weaker during removal of the mixed impurity fractions. During the last 7 cycles (cycles 14-20), the slower moving impurity benzo[a]anthracene is removed. After the recycle process is complete, the target compound, chrysene, is collected.

TABLE 2

| Time [min] | Valve 1 | Valve 2 | Cycle Number |
|---|---|---|---|
| 3.63 | A | B | Transfer starts |
| 4.60 | A | A | Transfer ends |
| 7.78 | A | B | Recycling starts |
| 7.78 | B | B | 1 |
| 15.02 | A | B | 2 |
| 20.39 | B | B | 3 |
| 25.76 | A | B | 4 |
| 31.13 | B | B | 5 |
| 36.50 | A | B | 6 |
| 41.87 | B | B | 7 |
| 47.24 | A | B | 8 |
| 52.61 | B | B | 9 |
| 57.98 | A | B | 10 |
| 63.35 | B | B | 11 |
| 68.72 | A | B | 12 |
| 74.09 | B | B | 13 |
| 79.46 | A | B | 14 |
| 84.83 | B | B | 15 |
| 90.20 | A | B | 16 |
| 95.57 | B | B | 17 |
| 100.94 | A | B | 18 |
| 106.31 | B | B | 19 |
| 111.68 | A | B | 20 |
| t > 111.68 | A | A | Collect pure target |

Separation of a Mixture of Vitamins: Four separate stock solutions (1 mg/mL) of vitamins A, D2, D3, and E are first prepared by dissolving about 4 mg of each solid chemical in the corresponding volume of pure methanol. Aliquots of 100 μL of each vitamin solution are pipetted and transferred into a 20 mL vial. A 100× dilution of each sample is prepared by adding the necessary volume of pure water to reach a final solution volume of 10 mL. The concentration of all four vitamins in the sample mixture is then equal to 10 ppm (g/g). The volume fraction of methanol in the sample mixture is then only equal to about 4%. The flow rate was fixed at 2.5 mL/min, the two-column oven and the two active solvent preheaters were set at a fixed temperature of 65° C. The injected sample volume was fixed at 300 μL. Prior to starting the process, column 2 is first equilibrated for 15 min with the mobile phase mixture of methanol and water (98.7/1.3, v/v) while valves 1 and 2 are on positions A and B, respectfully. Then, valve 2 is switched to position A and the column 1 is equilibrated during 15 min with another methanol/water eluent mixture (92.8/7.2, v/v).

Figure 15:
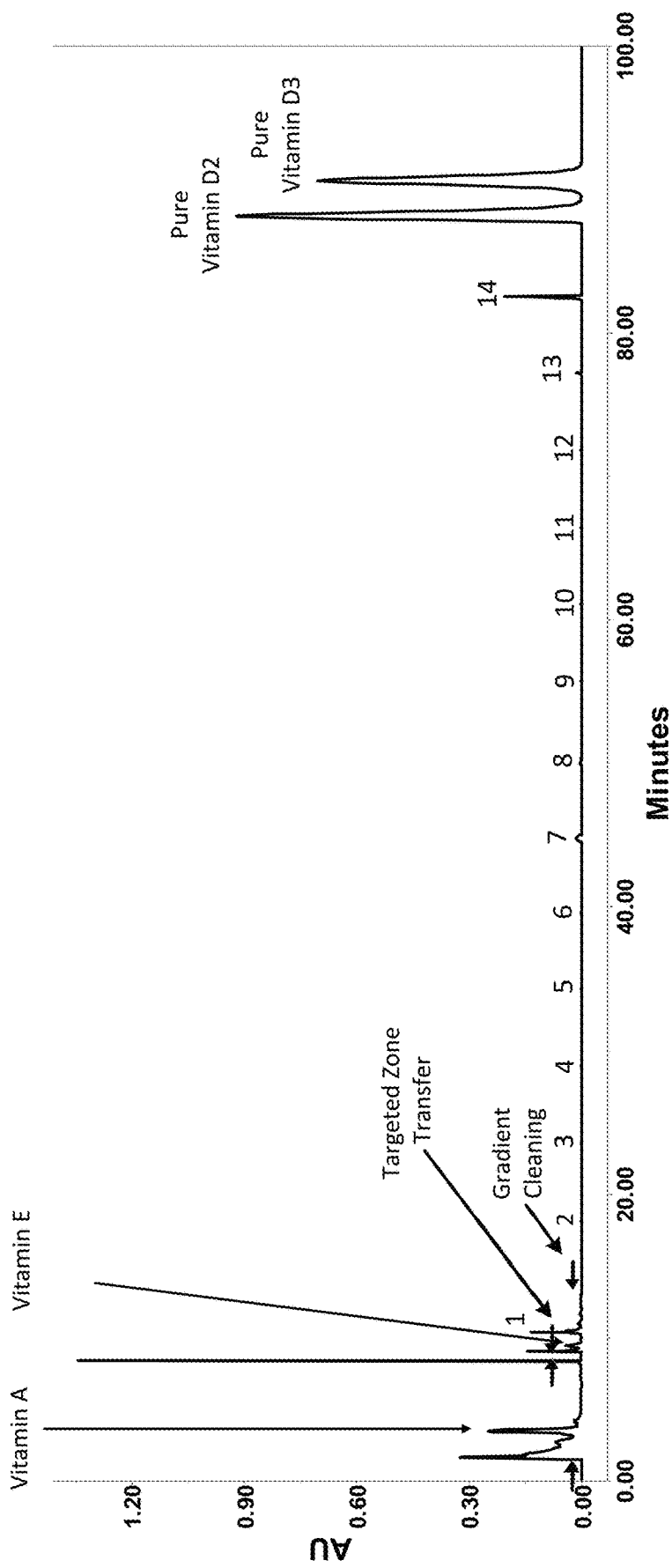
FIG. 15 shows a chromatogram of the measurement of the retention times of during a gradient twin column recycling liquid chromatography test used to separate a mixture of vitamins.

FIG. 15 depicts a test run using the mixture of the four vitamins described above. After sample injection, the concentration of methanol is linearly increased from 92.8% to 98.3% during a period of 7.88 min. At 7.88 minutes, the volume fraction of methanol is suddenly increased from 98.3% to 98.7% allowing for the equilibrium of column 1 before the recycling process starts at time t=10.33 min. Vitamins D2 and D3 were transferred as an analyte band to the second chromatographic column from 8.25 minutes to 9.02 minutes. Late eluting Vitamin E were removed from the chromatography system from 9.02 minutes until recycle begins at 10.33 minutes, while the analyte band was parked at on the second chromatographic column. At 10.33 minutes the recycle process is initiated by passing the analyte band through the second column. The analyte band passes between the first and second columns for 14 cycles. After the recycle process is complete, the target compounds, Vitamin D2 and Vitamin D3, are collected. All the events regarding the mobile phase composition and the positions of valves 1 and 2 are listed in Table 3 as a function of time. This table is used to automate the whole GTCRLC process for the isolation and baseline separation of vitamins D2 and D3.

TABLE 3

| Time [min] | Valve 1 | Valve 2 | Cycle Number |
|---|---|---|---|
| 8.35 | A | B | Transfer starts |
| 9.02 | A | A | Transfer ends |
| 10.33 | A | B | Recycling starts |
| 10.33 | B | B | 1 |
| 18.13 | A | B | 2 |
| 23.50 | B | B | 3 |
| 28.87 | A | B | 4 |
| 34.24 | B | B | 5 |
| 39.61 | A | B | 6 |
| 44.98 | B | B | 7 |
| 50.35 | A | B | 8 |
| 55.72 | B | B | 9 |
| 61.09 | A | B | 10 |
| 66.46 | B | B | 11 |
| 71.83 | A | B | 12 |
| 77.20 | B | B | 13 |
| 82.57 | A | B | 14 |
| t > 82.57 | A | A | Collect pure target |

Those skilled in the art will recognize, or be able to ascertain using no more than routine experimentation, numerous equivalents to the specific procedures described herein. Such equivalents were considered to be within the scope of this technology and are covered by the following claims. The contents or all references, issued patents, and published patent applications cited throughout this application are hereby incorporated by reference.

The invention claimed is:

1. A method of performing recycling chromatography comprising:
    injecting a sample into a mobile phase flow stream of a chromatography system to create a combined flow stream, the sample comprising: an organic compound and a plurality of impurities, the chromatography system comprising:
        a first chromatographic column and a second chromatographic column coupled to each other in series; and
        a fraction collector coupled to the first chromatographic column and the second chromatographic column;
    passing the sample through the first chromatographic column using a gradient mobile phase stream, wherein during passage of the sample through the first chromatographic column low retention time impurities are transferred to the fraction collector, wherein the low retention time impurities are impurities that have a lower retention time than the organic compound when using the gradient mobile phase and;
        wherein the organic compound and a subset of the plurality of impurities having a similar elution to the organic compound when using the gradient mobile phase are transferred to the second chromatographic column as an analyte band using the gradient mobile phase; and
        wherein high retention time impurities remain in the first chromatographic column, wherein the high retention time impurities are impurities that have a higher retention time than the organic compound when using the gradient mobile phase;
    passing the analyte band through the second chromatographic column using an isocratic mobile phase stream;
    recycling the analyte band from the second chromatographic column to the first chromatographic column and from the first chromatographic column to the second chromatographic column using the isocratic mobile phase stream until a baseline resolution of the organic compound and the impurities, having a similar elution to the organic compound, present in the analyte band is achieved;

passing the organic compound to the fraction collector.

2. The method of claim 1, wherein at least a portion of the low retention time impurities are transferred to the fraction collector prior to transferring the organic compound to the second chromatographic column during passage of the sample through the first chromatographic column using the gradient mobile phase stream.

3. The method of claim 1, wherein at least a portion of the high retention time impurities are transferred to the fraction collector, after transferring the organic compound to the second chromatographic column, using the gradient mobile phase stream.

4. The method of claim 1, further comprising:
stopping flow of the gradient mobile phase through the second chromatographic column after the analyte band is transferred from the first chromatographic column to the second chromatographic column;
continuing flow of the gradient mobile phase stream through the first chromatographic column to remove at least a portion of the high retention time impurities from the first chromatographic column, while flow of a mobile stream through the second chromatographic column is stopped;
flowing an isocratic mobile phase stream through the first chromatography column until the column is equilibrated with the isocratic mobile phase stream; and
initiating flow of the isocratic mobile phase stream through the second chromatography column.

5. The method of claim 1, wherein the chromatographic system is a high performance liquid chromatography system.

6. The method of claim 5, wherein the chromatographic system is a semi-preparative high performance liquid chromatography system.

7. The method of claim 1, wherein chromatography system further comprises one or more valves coupling a pump to the first chromatographic column and the second chromatographic column and coupling the first chromatographic column and the second chromatographic column to the fraction collector, wherein the method further comprises activating the one or more valves at predetermined times, wherein the predetermined times are selected to automatically separate the subset of the plurality of impurities from the organic compound.

8. The method of claim 1, further comprising analyzing the gradient mobile phase stream or the isocratic mobile phase stream for the presence of the organic compound and/or the presence of the plurality of impurities as the gradient mobile phase stream or the isocratic mobile phase stream exits the first chromatographic column.

9. The method of claim 8, further comprising directing the gradient mobile phase stream exiting the first chromatographic column to the fraction collector or the second chromatographic column based on the analysis of the gradient mobile phase stream as the gradient mobile phase stream exits the first chromatographic column.

10. The method of claim 8, further comprising directing the isocratic mobile phase stream exiting the first chromatographic column to the fraction collector or the second chromatographic column based on the analysis of the isocratic mobile phase stream as the isocratic mobile phase stream exits the first chromatographic column.

* * * * *